(12) United States Patent
Kotecha et al.

(10) Patent No.: US 12,111,798 B2
(45) Date of Patent: Oct. 8, 2024

(54) CLOUD BASED SCHEMA MAPPING FEATURE STORE

(71) Applicant: ORACLE INTERNATIONAL CORPORATION, Redwood Shores, CA (US)

(72) Inventors: Yagnesh Dilipbhai Kotecha, Maharashtra (IN); Hari Bhaskar Sankaranarayanan, Bangalore (IN); Sandeep Jain, Bangalore (IN); Jagathi Harshitha Arumalla, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/587,346

(22) Filed: Jan. 28, 2022

(65) Prior Publication Data
US 2023/0244644 A1    Aug. 3, 2023

(51) Int. Cl.
*G06F 16/21*     (2019.01)
*G06F 40/295*   (2020.01)

(52) U.S. Cl.
CPC .......... *G06F 16/212* (2019.01); *G06F 40/295* (2020.01)

(58) Field of Classification Search
CPC .............................. G06F 16/212; G06F 40/295
See application file for complete search history.

(56) References Cited

U.S. PATENT DOCUMENTS

| | | | |
|---|---|---|---|
| 6,996,589 B1 * | 2/2006 | Jayaram | G06F 16/258 |
| 11,238,016 B1 * | 2/2022 | Srinivasan | G06F 16/212 |
| 2003/0217069 A1 * | 11/2003 | Fagin | G06F 16/258 |
| | | | 707/999.102 |
| 2004/0225671 A1 * | 11/2004 | Carroll | G06F 16/254 |
| 2007/0203922 A1 * | 8/2007 | Thomas | G06F 16/258 |
| 2019/0155924 A1 * | 5/2019 | Guggilla | G06F 16/335 |
| 2019/0384836 A1 | 12/2019 | Roth et al. | |
| 2020/0176098 A1 * | 6/2020 | Lucas | G16H 70/40 |

(Continued)

FOREIGN PATENT DOCUMENTS

| | | |
|---|---|---|
| IN | 201921051886 A | 6/2021 |
| WO | 2021091550 A1 | 5/2021 |

OTHER PUBLICATIONS

Berlin et al. "Database Schema Matching Using Machine Learning with Feature Selection", 2002, pp. 6-10 (Year: 2002).*

(Continued)

*Primary Examiner* — Matthew J Ellis
(74) *Attorney, Agent, or Firm* — Potomac Law Group, PLLC

(57) ABSTRACT

Embodiments map a source schema to a target schema using a feature store. Embodiments receive a file including a plurality of source schema elements and a plurality of target schema elements, the file including a plurality of unmapped elements. Embodiments retrieve rule based mappings for the unmapped elements between the source schema elements and the target schema elements. Based on semantic matching of the source schema elements, embodiments retrieve feature store based mappings from the feature store for the unmapped elements between the source schema elements and the target schema elements. Embodiments then generate one or more similarity scores for mappings of the source schema elements to the target schema elements.

20 Claims, 12 Drawing Sheets

(56) References Cited

U.S. PATENT DOCUMENTS

| | | | | |
|---|---|---|---|---|
| 2020/0294633 | A1* | 9/2020 | Namboodiri | G06F 16/88 |
| 2020/0311304 | A1* | 10/2020 | Parthasarathy | G06F 11/3006 |
| 2021/0026835 | A1* | 1/2021 | Pai | G06F 40/295 |
| 2021/0383067 | A1* | 12/2021 | Reisswig | G06F 40/295 |
| 2022/0019740 | A1* | 1/2022 | Meyerzon | G06F 16/906 |

OTHER PUBLICATIONS

Drumm, 2008, "Improving Schema Mapping by Exploiting Domain Knowledge," Doctoral dissertation, Karlsruhe Institute of Technology, pp. 1-235, Karlsruhe, Germany.*

Berlin et al., "Database Schema Matching Using Machine Learning with Feature Selection," CAISE, 2002, pp. 452-466, Sprinter-Verlag Berlin Heidelberg, Berlin, Germany.

Buso et al., "Hopsworks Feature Store API 2.0, a new paradigm.," Logical Clocks, 2020, retrieved on: Oct. 2021, retrieved from: https://www.logicalclocks.com/blog/hopsworks-feature-store-api-2-0, pp. 1-5.

Dowling, "Hopsworks Feature Store 2.0," Medium, 2020, retrieved on: Oct. 2021, retrieved from: https://medium.com/data-for-ai/hopsworks-feature-store-2-0-7169420adc7d, pp. 1-6.

Drumm, "Improving Schema Mapping by Exploiting Domain Knowledge," Doctoral dissertation, Karlsruhe Institute of Technology, 2008, pp. 1-235, Karlsruhe, Germany.

Gebremeskal et al., "How to transform Amazon Redshift data into features with Hopsworks Feature Store," Logical Clocks, Feb. 2021, retrieved on: Oct. 2021, retrieved from: https://www.logicalclocks.com/blog/how-to-transform-amazon-redshift-data-into-features-with-hopsworks-feature-store, pp. 1-6.

Hernandez et al., "Clio: a Sem-Automatic Tool For Schema Mapping," Proceedings of the ACM SIGMOD, 2001, Santa Barbara, California, p. 607.

Manakanatas et al., "A Tool for Semi-Automated Semantic Schema Mapping: Design and Implementation," Proceedings of the CAISE*06 Workshop on Data Integration and the Semantic Web, 2006, pp. 290-306, Luxemburg, Germany.

Meister, "How to Engineer and Use Features in Azure ML Studio with the Hopsworks Feature Store," Logical Clocks, Feb. 2021, retrieved on Oct. 2021, retrieved from: https://www.logicalclocks.com/blog/how-to-engineer-and-use-features-in-azure-ml-studio-with-the-hopsworks-feature-store, pp. 1-8.

Ogasawara, "A Streaming Feature Store Based on Flink andthe AWS SageMaker Feature Store API," Cloudian, Jul. 2021, p. 1-6, retrieved from: https://cloudian.com/blog/a-streaming-feature-store-based-on-flink-and-the-aws-sagemaker-feature-store-api/.

Sell et al., "Introducing Feast: an open source feature store for machine learning," AI & Machine Learning, 2019, Google Cloud, pp. 1-4.

Unknown, "Data model and resources," Vertex AI—Google Cloud, Oct. 2021, pp. 1-6, retrieved from: https://cloud.google.com/vertex-ai/docs/featurestore/concepts.

Unknown, "Entity," FEAST, 2021, retrieved on Oct. 2021, retrieved from: https://docs.feast.dev/getting-started/concepts/entity, p. 1.

Unknown, "Feast: Feature Store for Machine Learning," Feast, 2021, retrieved on Oct. 2021, retrieved from: https://feast.dev, pp. 1-3.

Unknown, "Feature," FEAST, 2021, retrieved on Oct. 2021, retrieved from: https://docs.feast.dev/getting-started/concepts/feature-view, p. 1.

Unknown, "Hopsworks Feature Store—Feature Management Platform for Machine Learning," A Logical Clocks White Paper, V.02, 2021, pp. 1-16.

Unknown, "Hopsworks Feature Store Now Available for Microsoft Azure," Logical Clocks, 2020, GlobalNewswire, retrieved on: Oct. 2021, retrieved from: https://www.globenewswire.com/en/news-release/2020/11/17/2128167/0/en/Hopsworks-Feature-Store-Now-Available-for-Microsoft-Azure.html, pp. 1-3.

Unknown, "Integrated Feature Store," IGUAZIO, 2021, retrieved on Oct. 2021, retrieved from:https://www.guazio.com/feature-store/, pp. 1-6.

Unknown, "Introduction to Feast," Kubeflow, Apr. 2021, retrieved on Oct. 2021, retrieved from: https://www.kubeflow.org/docs/external-add-ons/feature-store/overview/, pp. 1-2.

Unknown, "Introduction to Vert ex Feature Store," Google Cloud, Oct. 2021, pp. 1-4, retrieved from: https://cloud.google.com/vertex-ai/docs/featurestore/overview.

Unknown, "Logical Clocks Launches Hopsworks.ai: The World's First Artificial Intelligence Cloud Platform with a Feature Store," Logical Clocks, Apr. 2020, retrieved on Oct. 2021, retrieved from: https://www.logicalclocks.com/news/logical-clocks-launches-hopsworks-ai-the-worlds-first-artificial-intelligence-cloud-platform-with-a-feature-store, pp. 1-5.

Unknown, "mlrun—Release UNKNOWN," Iguazio, Aug. 2021, pp. 1-307.

Unknown, "Operational Machine Learning Pipelines," Iguazio, 2021, retrieved on Oct. 2021, retrieved from: https://www.iguazio.com/platform/, pp. 1-8.

Unknown, "Overview," FEAST, 2021, retrieved on Oct. 2021, retrieved from: https://docs.feast.dev/v/master/getting-started/concepts/overview, p. 1.

Unknown, "Step 4: Generating training data," FEAST, 2021, retrieved on Oct. 2021, retrieved from: https://docs.feat.dev/getting-started/quickstart, p. 1.

Unknown, "What is a Feature Store?" IGUAZIO, 2021, retrieved on Oct. 2021, retrieved from: https://www.iguazio.com/glossary/feature-store/, pp. 1-5.

* cited by examiner

CLOUD BASED SCHEMA MAPPING FEATURE STORE

FIELD

One embodiment is directed generally to a computer system, and in particular to a schema mapping feature store computer system.

BACKGROUND INFORMATION

Cloud service providers provide various services in the "cloud", meaning over a network, such as the public Internet, and remotely accessible to any network-connected client device. Examples of the services models used by cloud service providers (also referred to herein as "cloud providers" or "providers") include infrastructure as a service ("IaaS"), platform as a service ("PaaS"), software as a service ("SaaS"), and network as a service ("NaaS"). IaaS providers provide customers with infrastructure resources such as processing, storage, networks, and other computing resources that the customer is able to use to run software. The customer does not manage the infrastructure, but has control over operating systems, storage, and deployed applications, among other things, and may be able to control some networking components, such as firewalls. PaaS providers provide a customer with a platform on which the customer can develop, run, and manage an application without needing to maintain the underlying computing infrastructure. SaaS is a software licensing and delivery model in which software is licensed to a customer on a subscription basis, and is centrally hosted by the cloud provider. Under this model, applications can be accessed, for example, using a web browser. NaaS providers provide network services to customers, for example, by provisioning a virtual network on the network infrastructure operated by another party. In each of these service models, the cloud service provider maintains and manages the hardware and/or software that provide the services, and little, if any, software executes on a user's device.

Customers of cloud service providers, which are also referred to herein as users and tenants, can subscribe to the service provider to obtain access to the particular services provided by the service provider. The service provider can maintain an account for a user or tenant, through which the user and/or tenant can access the provider's services. The service provider can further maintain user accounts that are associated with the tenant, for individual users.

Many different enterprise applications can be hosted in the cloud as part of the SaaS model. One challenge is to allow different cloud hosted enterprise applications, which may have different schemas, to be able to exchange data on the cloud.

SUMMARY

Embodiments map a source schema to a target schema using a feature store. Embodiments receive a file including a plurality of source schema elements and a plurality of target schema elements, the file including a plurality of unmapped elements. Embodiments retrieve rule based mappings for the unmapped elements between the source schema elements and the target schema elements. Based on semantic matching of the source schema elements, embodiments retrieve feature store based mappings from the feature store for the unmapped elements between the source schema elements and the target schema elements. Embodiments then generate one or more similarity scores for mappings of the source schema elements to the target schema elements.

BRIEF DESCRIPTION OF THE DRAWINGS

Further embodiments, details, advantages, and modifications will become apparent from the following detailed description of the embodiments, which is to be taken in conjunction with the accompanying drawings.

DETAILED DESCRIPTION

Embodiments generate and deploy on the cloud a feature store that automatically maps a schema for a first application to a schema of a second application. Embodiments automate or recommend a schema mapping generation by building a mapping taxonomy based on the feature store and associating the mapping terms through feature extraction, rule-based matching for simple data types and semantic matching through machine learning models. The feature extraction entails the named entity recognition of the attributes of the source and target schema automatically. The associated terms are stored as feature vectors in the feature store.

A schema is a blueprint that defines the layout and format of data records contained in a database, in memory, or in a file corresponding to an application. For example, a database table may contain one or more data records and a schema may correspondingly define a logical grouping of one or more database tables. A schema may include all the implementation details necessary to store data records, such as the data types of the data records, constraints on the data records, foreign or primary keys associated with the data records, etc. File type schemas include XML and JSON schemas that describe the structure of a file/document.

With multiple applications operating on the cloud, the transformation process of the mapping of fields/schema when two different enterprise systems/applications, particularly business to business applications, interoperate with each other, can be difficult. The systems may have been built on different data models and platforms while they exchange information to achieve business processes and outcomes. For example, the purchase order in one system (e.g., point of sale applications) needs to be consumed in another system to generate invoices (e.g., enterprise resource planning ("ERP") applications) for sharing with the customer over email through a customer relationship management ("CRM") application. The schema mapping is conventionally done through style sheet transformations or sets of rules to link the mapping visually through a builder interface. However, this process is time consuming and error prone and generally always require human "domain experts" who are needed to validate the mapping.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

Figure 1:
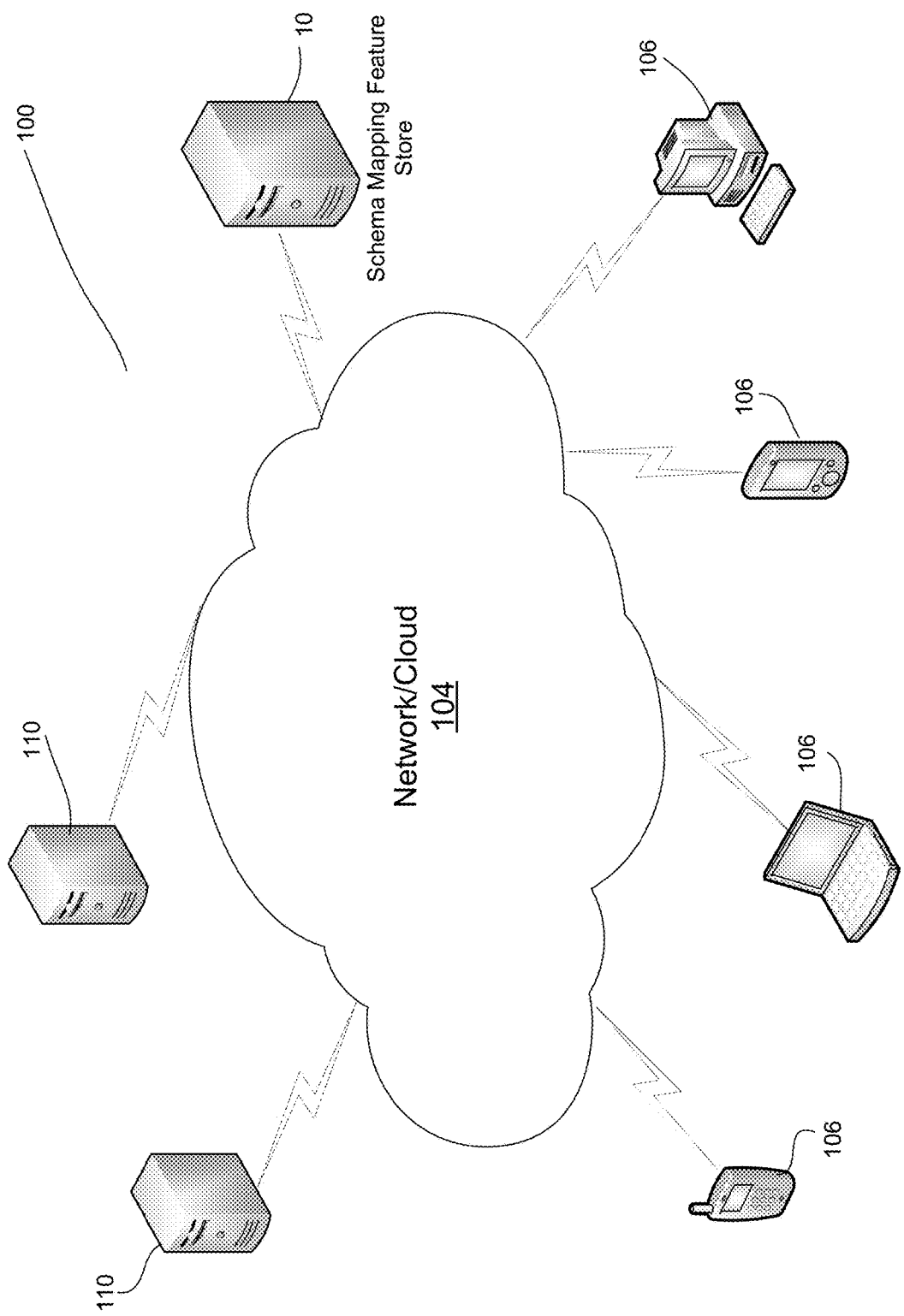
FIG. 1 illustrates an example of a system that includes a schema mapping feature store system in accordance to embodiments.

FIG. 1 illustrates an example of a system 100 that includes a schema mapping feature store system 10 in accordance to embodiments. Schema mapping feature store system 10 may be implemented within a computing environment that includes a communication network/cloud 104. Network 104 may be a private network that can communicate with a public network (e.g., the Internet) to access services 110 provided by a cloud services provider. Examples of communication networks include a mobile network, a wireless network, a cellular network, a local area network ("LAN"), a wide area network ("WAN"), other wireless communication networks, or combinations of these and other networks. Schema mapping feature store system 10 may be administered by a service provider, such as via the Oracle Cloud Infrastructure ("OCI") from Oracle Corp.

Tenants of the cloud services provider can be organizations or groups whose members include users of services offered by service provider. Services may include or be provided as access to, without limitation, an application, a resource, a file, a document, data, media, or combinations thereof. Users may have individual accounts with the service provider and organizations may have enterprise accounts with the service provider, where an enterprise account encompasses or aggregates a number of individual user accounts.

System 100 further includes client devices 106, which can be any type of device that can access network 104 and can obtain the benefits of the functionality of schema mapping feature store system 10 of automatically mapping two different schemas of two different enterprise applications. As disclosed herein, a "client" (also disclosed as a "client system" or a "client device") may be a device or an application executing on a device. System 100 includes a number of different types of client devices 106 that each is able to communicate with network 104.

Figure 2:
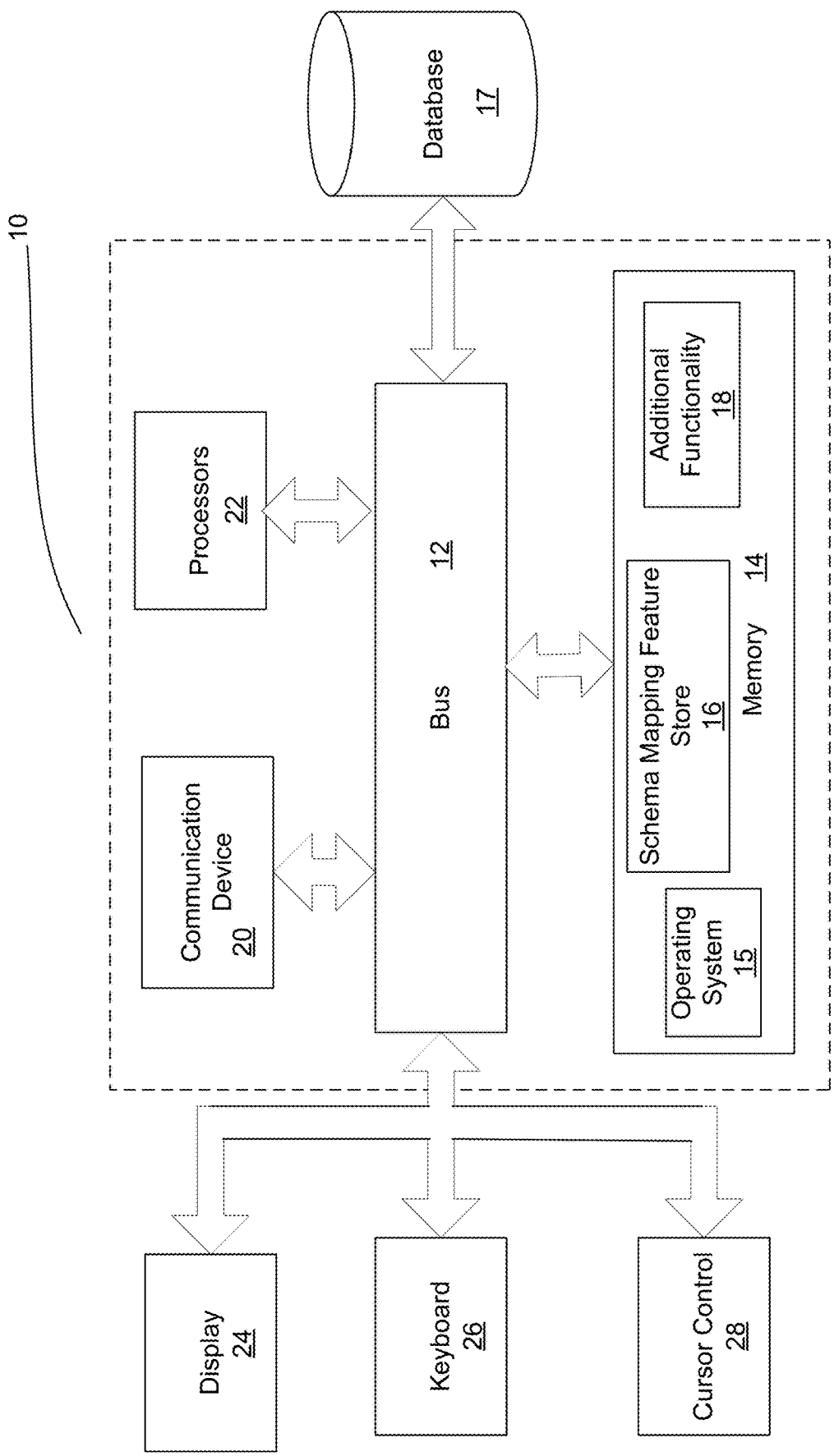
FIG. 2 is a block diagram of the schema mapping feature store system of FIG. 1 in the form of a computer server/system in accordance with an embodiment of the present invention.

FIG. 2 is a block diagram of schema mapping feature store system 10 of FIG. 1 in the form of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a schema mapping feature store module 16 that automatically maps two different schemas of two different enterprise applications using a feature store, and all other functionality disclosed herein. System 10 can be part of a larger system. Therefore, system 10 can include one or more additional functional modules 18 to include the additional functionality, such as any other functionality provided by the Oracle Cloud Infrastructure ("OCI") from Oracle Corp. A file storage device or database 17 is coupled to bus 12 to provide centralized storage for modules 16 and 18, including data regarding previous schema mappings. In one embodiment, database 17 is a relational database management system ("RDBMS") that can use Structured Query Language ("SQL") to manage the stored data.

In one embodiment, database 17 is implemented as an in-memory database ("IMDB"). An IMDB is a database management system that primarily relies on main memory for computer data storage. It is contrasted with database management systems that employ a disk storage mechanism. Main memory databases are faster than disk-optimized databases because disk access is slower than memory access, the internal optimization algorithms are simpler and execute fewer CPU instructions. Accessing data in memory eliminates seek time when querying the data, which provides faster and more predictable performance than disk.

In one embodiment, database 17, when implemented as an IMDB, is implemented based on a distributed data grid. A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability, and information reliability. In particular examples, distributed data grids, such as, e.g., the "Oracle Coherence" data grid from Oracle Corp., store information in-memory to achieve higher performance, and employ redundancy in keeping copies of that information synchronized across multiple servers, thus ensuring resiliency of the system and continued availability of the data in the event of failure of a server.

As disclosed, data records often need to be transformed from being structured in accordance with a first schema to being structured in accordance with a second schema. Also known as "schema mapping", such transformations may occur in a wide variety of settings. For example, if a machine learning model has a particular schema requirement for its input data, then data records should be transformed to be structured in accordance with the particular schema requirement before being passed to the machine learning model. As another example, if a legacy database is replaced by a new database that structures data in accordance with a new schema, then the existing data records in the legacy database should be transformed to be structured in accordance with the new schema. Further, enterprise applications, and corresponding data, have their own schema and can require transformation when the data from the first application is transferred to another application.

Generally, known solutions for schema mapping is performed as follows: a schema transformation system provides a user with a list of pre-determined schema mapping techniques to choose from. Next, the user manually selects a schema mapping technique from the list. Then, the schema transformation system applies the selected schema mapping technique to transform data records from being structured in accordance with a first schema to being structured in accordance with a second schema.

In particular, the mapping of fields/schema when two different enterprise systems/applications interoperate with each other can be difficult. Known extract, transform, load ("ETL") mapping tools and configuration approaches are generally performed manually or require manual intervention. In contrast, embodiments capture the mapping process in a feature store operating over the cloud. The feature store encompasses the domain knowledge within the cloud based applications which makes it richer to build and access.

In machine learning and pattern recognition, a "feature" is an individual measurable property or characteristic of a phenomenon. Choosing informative, discriminating and independent features is a crucial element of effective algorithms in pattern recognition, classification and regression. In data science, a "feature store" can provide a single pane of glass for sharing all available features. When a data scientist starts a new project, he or she can go to the feature store, functioning in part as a catalog, and easily find the features they are looking for. However, a feature store is not only a data layer, it is also a data transformation service enabling users to manipulate raw data and store it as features ready to be used by any machine learning model.

One example schema is the Extensible Markup Language ("XML") schema (also referred to as XML Schema Definition ("XSD") schema). The XML schema is a description of a type of XML document, typically expressed in terms of constraints on the structure and content of documents of that type, above and beyond the basic syntactical constraints imposed by XML itself. These constraints are generally expressed using some combination of grammatical rules governing the order of elements, Boolean predicates that the content must satisfy, data types governing the content of elements and attributes, and more specialized rules such as uniqueness and referential integrity constraints.

An XML schema defines the valid content of XML files. An XML schema file, like a DTD file, contains only metadata. An XML schema defines the structure and type of elements and attributes for an associated XML file. When a schema is used to define an XML file, data can be restricted, data formats can be defined, and data can be converted between datatypes. An XML schema supports complex types and inheritance between types. A schema provides a way to specify element and attribute groups, any content, and circular references.

Another example schema is the JavaScript Object Notation ("JSON") schema which specifies a JSON-based format to define the structure of JSON data for validation, documentation, and interaction control. It provides a contract for the JSON data required by a given application, and how that data can be modified. The JSON schema is based on the concepts from XSD, but is JSON-based. As in XSD, the same serialization/deserialization tools can be used both for the schema and data, and it is self-describing. In general, JSON is a hierarchical nesting of objects and arrays. A JSON object is an unordered set of key/value pairs that begins with a left brace ("{") and ends with a right brace ("}"), where the keys may correspond to fields and the values may correspond to entries for those fields. The values may be character strings, numbers, Boolean values, or null values, as well as objects or arrays. JSON arrays are ordered sets of values that begin with a left bracket ("[") and end with a right bracket (|). The values in an array are separated by commas.

Figure 3:
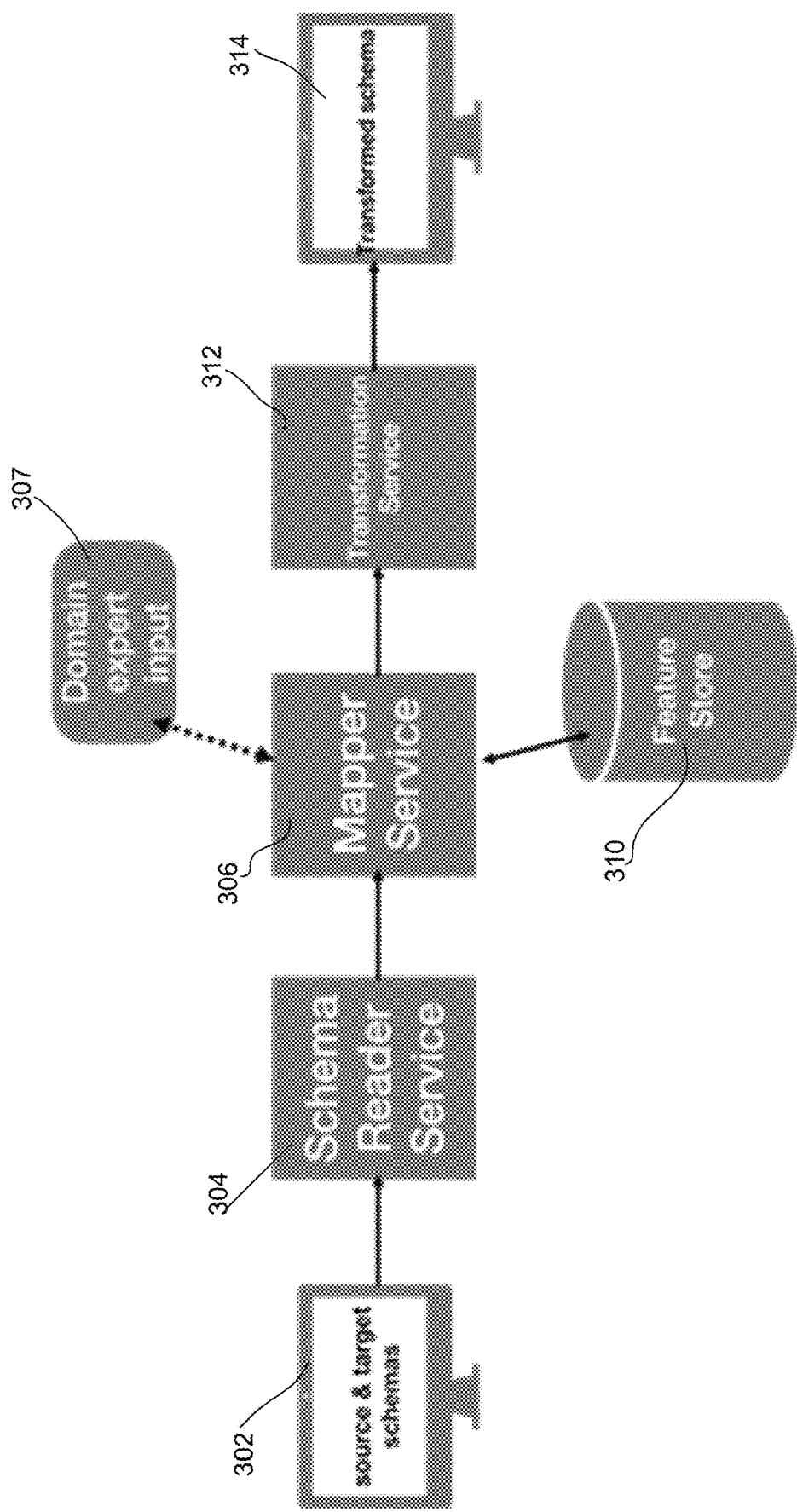
FIG. 3 is a block diagram of the functionality of schema mapping feature store system of FIG. 1 in accordance to embodiments.

FIG. 3 is a block diagram of the functionality of schema mapping feature store system 10 of FIG. 1 in accordance to embodiments.

At 302, the source and target schemas are received in the form of data such as XSD or JSON data. In embodiments, both the source and target schemas are the same schemas (e.g., both XSD or both JSON). A schema reader service 304 acquires the source and target schemas and parses them to extract all of the attributes/terms/names that correspond to the data. For example, a first schema may have an attribute of "Last Name" for a person's last name, while a second schema may have an attribute of "Surname" for a person's last name. The same last name data needs to be mapped from the "Last Name" attribute of the first schema to the "Surname" attribute of the first schema. As another example, the first schema may have "First Name" and "Last Name" attributes, while the second schema may only have a single "Name" attribute for both first and last name.

A mapper service 306 consumes the attributes to generate a mapping based feature store 310 which includes potential matches for each attribute. Feature store 310 is built over a period of time through online learning or by feeding pre-trained domain ontologies with domain expert input 307. A transformation service 312 then converts source messages (i.e., a message payload, header and properties) of the source schema to target messages of the target schema as a transformed schema 314 automatically and/or with a human in loop who can accept the recommendations generated. Subsequently, the underlying data from the source schema flows to the target schema under the corresponding mapped attributes.

Figure 4:
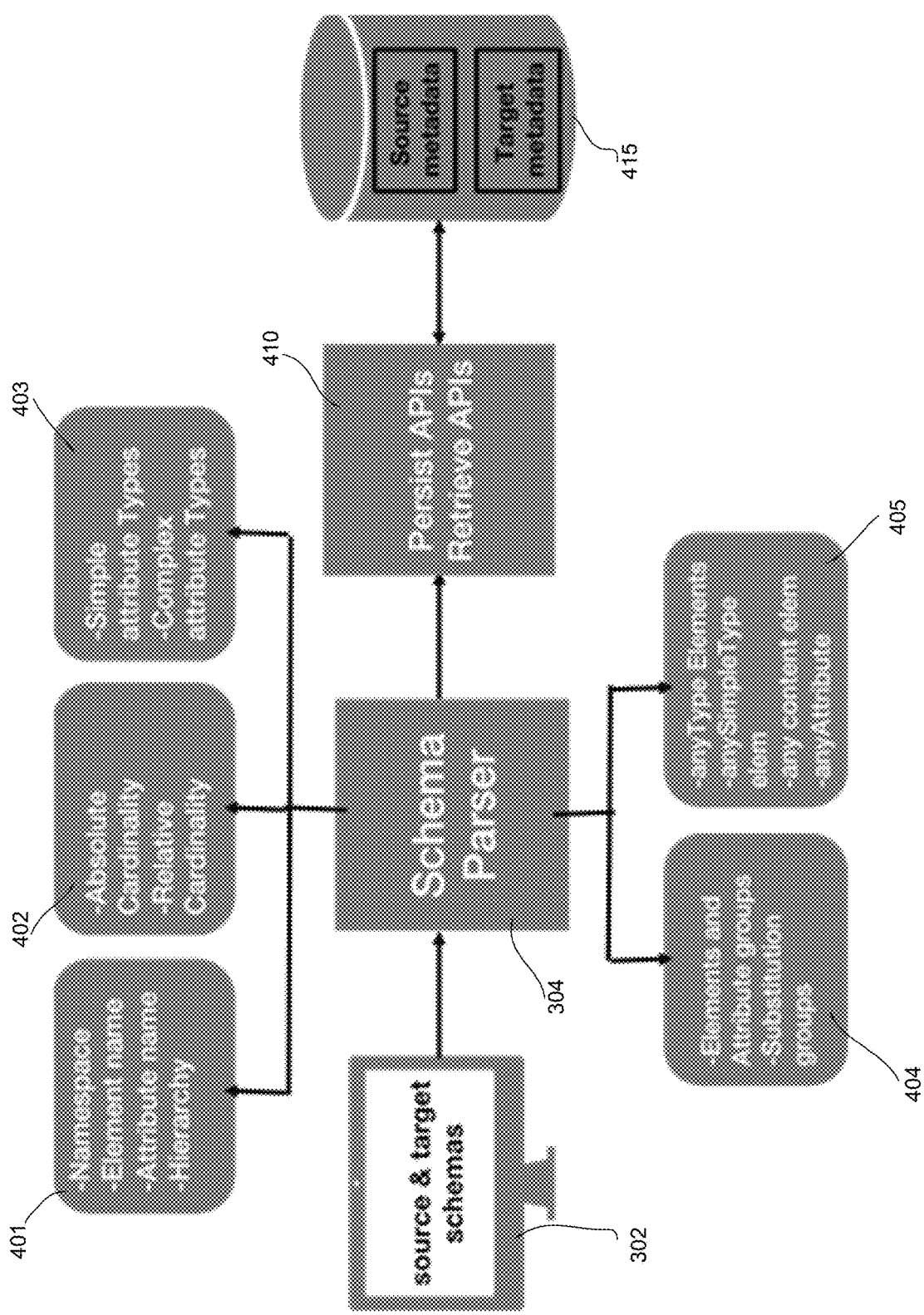
FIG. 4 is a block diagram of the parsing functionality of the schema reader service of FIG. 3 in accordance to embodiments.

FIG. 4 is a block diagram of the parsing functionality of schema reader service 304 of FIG. 3 in accordance to embodiments. The example shown in FIG. 4 is for an XSD/XML schema, where both source and targets use the XSD schema. 401-405 are examples of attributes parsed from the target schema in the form of XSD related components. APIs at 410 are used to store source metadata and target metadata in a metadata storage 415. Examples of source metadata and target metadata are as follows:

```
Source XSD Metadata:
<xs:element name="shipto">
    <xs:complexType>
        <xs:sequence>
            <xs:element ref="name"/>
            <xs:element ref="address"/>
            <xs:element ref="city"/>
            <xs:element ref="country"/>
        </xs:sequence>
    </xs:complexType>
</xs:element>
Target XSD Metadata:
<xs:element name="deliverTo">
    <xs:complexType>
        <xs:sequence>
            <xs:element ref="firstname"/>
            <xs:element ref="lastname"/>
            <xs:element ref="address"/>
            <xs:element ref="city"/>
            <xs:element ref="country"/>
        </xs:sequence>
    </xs:complexType>
</xs:element>
Source JSON metadata:
{
"source" : [
    {"elementName" : "shipTo",
     "elementType" : "string",
     "elementParent" : ""
    },
    {"elementName" : "name",
     "elementType" : "string",
     "elementParent" : "shipTo"
    },
    ...
    ...
]
}
Target JSON Metadata:
{
"target" : [
    {"elementName" : "deliverTo",
     "elementType" : "string",
     "elementParent" : ""
    },
    {"elementName" : "firstname",
     "elementType" : "string",
     "elementParent" : "deliverTo"
    },
    ...
    ...
]
}
```

Figure 5:
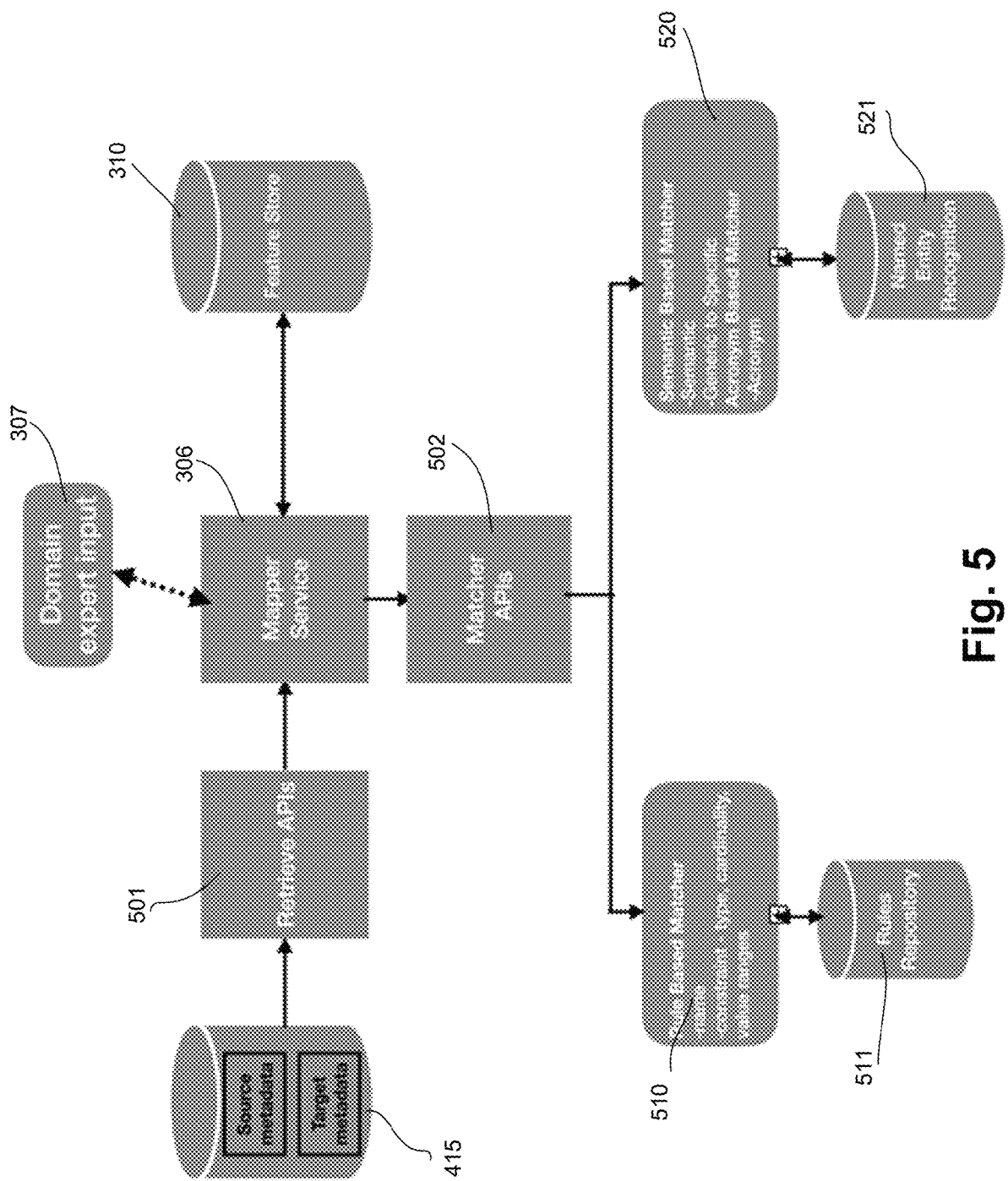
FIG. 5 is a block diagram of the mapping functionality of the mapper service of FIG. 3 in accordance to embodiments.

FIG. 5 is a block diagram of the mapping functionality of mapper service 306 of FIG. 3 in accordance to embodiments. Mapper service 306, via APIs 501, retrieves the source and target metadata from 415. Mapper service 306, via APIs 502, then matches source attributes of the source schema with target attributes of the target schema. In embodiments, the matching is done via a rule based matcher 510 using a rules repository 511, and/or via a semantic based matcher 520 using named entity recognition ("NER") 521. NER is a subtask of information extraction that seeks to locate and classify named entities mentioned in unstructured text into pre-defined categories such as person names, organizations, locations, medical codes, time expressions, quantities, monetary values, percentages, etc. In embodiments, the source and target metadata are first attempted to be fetched for matching the source and target attributes using rule based at 510, and then semantic based at 520. Other source and target attributes may not have a match after using both the rule based matcher 510 or the semantic based matcher 520.

As an example, the below JSON "interimoutput.json" can be the result after rule based matching (e.g., it includes unmatched attributes that were not matched using rule based matcher 510). It will be fetched by mapper service 306, which will try to map pending source and target elements. Mapper service 306 will first execute rule based matcher 510. If there are still elements to be matched after the matches generated by rule based matcher 510, mapper service 306 will try a lookup from feature store 310. If all the remaining mapping information is not available in feature store 310, it will look up from NER repository 521 via semantic based matcher 520. If mapping information is found in NER repository then it will update interimoutput.json with the found mapping information and also update feature store 310. If it is able to match completely, then the final output will be provided to the user. Otherwise, a human-in-loop logic uses a domain expert to perform manual mapping using the interimoutput.json generated by semantic based matching. After the domain expert performs manual mapping, the final output json file will be generated. Also, manual mapping information provided by the domain expert will be recorded in a dataset for training the existing model. Semantic based matching service 520 will fetch this dataset for further training of the model at a specified interval (e.g., daily, weekly, etc.).

```
Interimoutput.json
{
"elementsMapped": [
{"name": "source",
    "firstname": "target",
    "lastname": "target"
},
{"address": "source",
    "address": "target"
}, similarly for city and country ...
...
],
"elementsNotMapped" : {
    "source" : [
        {"elementName" : "shipTo",
         "elementType" : "string",
         "elementParent" : ""
        }],
    "target" : [
        {"elementName" : "deliverTo",
         "elementType" : "string",
         "elementParent" : ""
        }]
}
```

Examples of the mapping of named entities from source to target are shown below, and classified from simple to complex. These "matches" may be retrieved from rules repository 511 and/or NER repository 521 and are stored as mapping information in feature store 310 as key-value pairs:

Simple (already available in many domains):
  Last name→Surname
  First name→Given name
  Postal code→Zip code
Medium (specific to domain but still some automated matching possible):
  Amount→Transaction value
  State→Province
  Comments→Delivery note, Special instructions Complex (may require domain expertise and training with human in loop):
   Index fund value→Exchange fund value
   Libor→Inter bank rate, exchange rate
   Card 4 digits→BIN value For each source attribute, mapping service 306 may retrieve one or more matching attributes from 511 and/or 521. The matching attributes are then recommended to the user with a corresponding confidence score if matching is done via NER 521. Embodiments use matching algorithms to match the attributes and generate the confidence score using semantic based matcher 520. The confidence score improves over a period of time using a learning process, such as transfer learning, re-training with newer datasets, etc. The matching algorithms in embodiments include one or more of (1) Word net similarity; (2) Cosine similarities in vector space; and/or (3) Synonym custom training. A user or human in loop can accept the recommendation or decline.

Embodiments continuously learn from the user and fine tune future recommendations. The learning is implemented by semantic matcher service 520. After a domain expert provides manual mapping information, this manual mapping information is persisted in a dataset. The dataset will be fed by semantic matcher service at a specific time and will use it for training NER repository 521. It will also update feature store 310 with the new learned mappings.

Feature store 310 in embodiments is a key value store where the keys are the source attributes/terms and the values are the matched/associated terms that are mined using NER. In embodiments, feature store 310 can be organized based on domain, sub-domain, entities, and values. For example, the following values can be matched to keys:
   Domain—HCM, ERP, CRM;
   Sub domain—Banking, Insurance, Retail, High tech;
   Entities—Order, Invoice, candidate, tax statement;
   Values—Numerical, categories, text, abbreviations, terms
      (List of values-currency code)

In embodiments, for every source term there are lists of probable matches returned by feature store 310 based on the confidence score at regular intervals. The recommendations can be restricted to, for example, top 5 matches or any configurable value, such as a threshold confidence score so that only matches with a confidence score above the threshold are listed. In embodiments, if the target element in the list, that target element may be automatically matched with the source element. The example below are possible matches for the source term "purchaseorderidentifier" with the corresponding confidence score:

```
{
   "sourceterm":"purchaseorderidentifier"
   "associatedmatchingterms":
   {
      {"POID","0.75"},
      {"PurchaseID","0.85"},
      {"PONumber","0.9"},
      {"PurchaseNumber","0.6"},
      {"PurchaseSerialNo","0.7"},
      {"PurchaseSNo","0.65"},
      {"invoiceNo","0.5"}
   }
}
```

Figure 6:
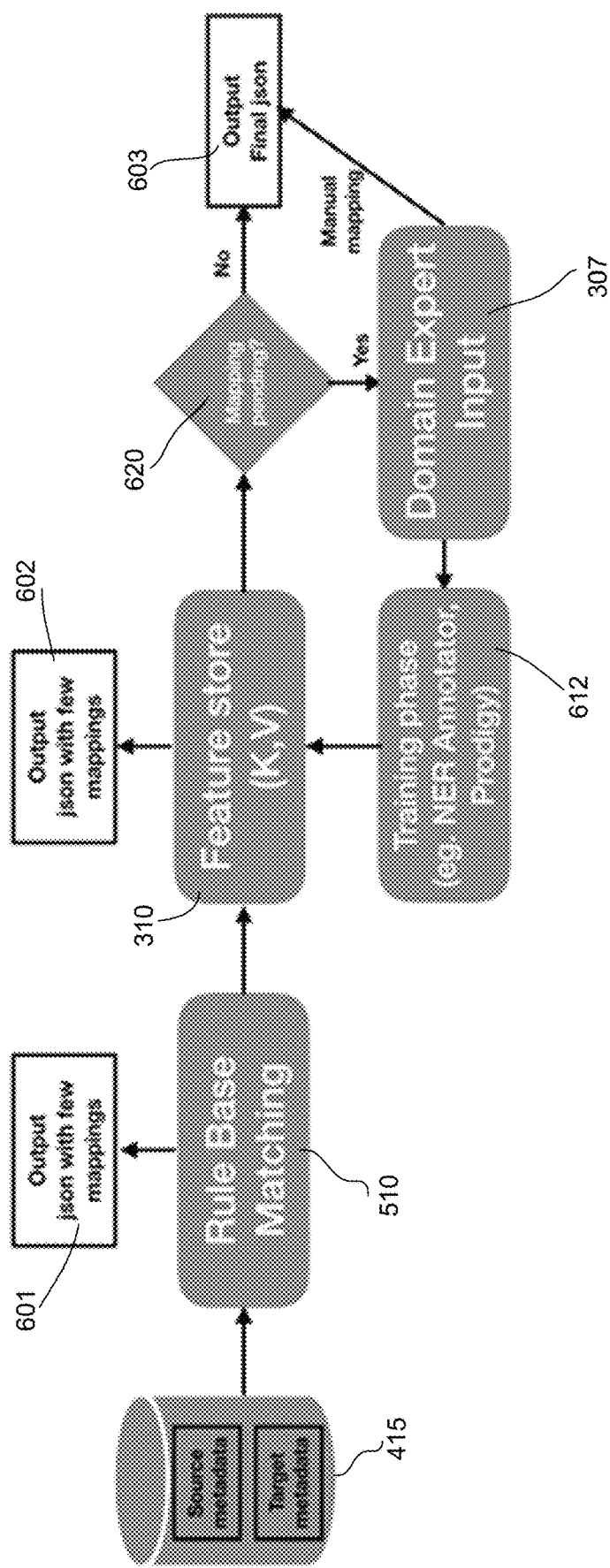
FIG. 6 is a block diagram of additional mapping functionality of the mapper service of FIG. 3 in accordance to embodiments.

FIG. 6 is a block diagram of additional mapping functionality of mapper service 306 of FIG. 3 in accordance to embodiments. Feature store 310 is used to look up matching terms for retrieval. Rule based matching 510 outputs JSON with the mappings at 601 in embodiments (i.e., the output format is JSON but both XSD and JSON schemas are supported in FIG. 6). Feature store 310 then outputs JSON with the mappings at 602. If no matchings are found at 620 (i.e., mappings are still pending), then domain expert input is received, and the training phase 612 is implemented and feature store 310 is further enriched after the training. Subsequent look-ups will be faster since the terms are now already trained and stored in feature store 310 as key values.

In embodiments, feature store only stores features from NER repository 521. There is no need to store rule based mappings, because it is merely processed based on "simple" rules. For example, the name of source and target elements matching, the structure of source and target matching, the type of source and target element matching, etc. NER, used by semantic based matcher 520, is a natural language processing ("NLP") based technique. NER is a sub-task of information extraction ("IE") that seeks out and categorizes specified entities in a body or bodies of texts. NER is also known as entity identification, entity chunking and entity extraction. In embodiments, the associated features are stored as feature vectors in feature store 310. A feature vector is an n-dimensional vector of numerical features that represent some object. Many algorithms in machine learning require a numerical representation of objects, since such representations facilitate processing and statistical analysis.

The final JSON mappings is generated at 603, which is the combined mappings of 601 and 602 plus manual mapping from 307. In some examples, embodiments can recommend all mappings with just rule based matching service output 601 and semantic based matching service output 602, so in that case final output is a combination of 601 and 602 only. In this example, there will be no manual intervention so there will be no 603 generated.

Figure 7:
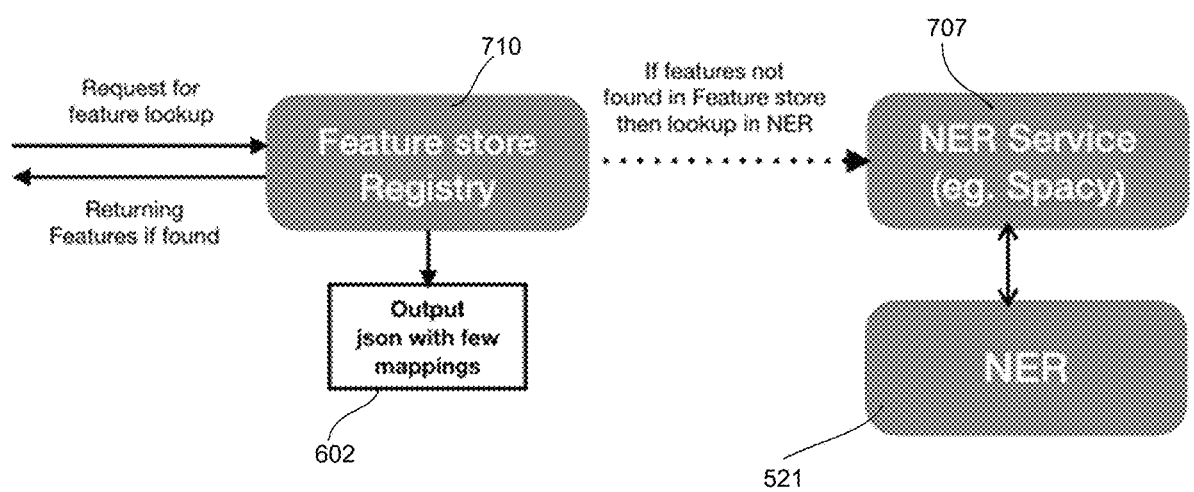
FIG. 7 is a block diagram of additional mapping functionality of the mapper service of FIG. 3 in accordance to embodiments.

FIG. 7 is a block diagram of additional mapping functionality of mapper service 306 of FIG. 3 in accordance to embodiments. Specifically, FIG. 7 shows a more detailed flow of semantic based matcher 520. The feature store registry 710 (i.e., key value storage) receives a request for a feature lookup (i.e., matching target terms in response to a source term). If the features are found via NER, they are output at 602. If the features are not found, the terms are mined based on NER where the terms are recognized through open source libraries such as Spacy or Natural Language Toolkit ("NLTK") to get the associated named entity for every term look up. An NER service uses libraries such as Spacy. These type of libraries provide an exceptionally efficient statistical system for NER which can assign labels to group of tokens which are contiguous. It also provides a default model which can recognize a wide range of named or numerical entities, which include person, organization, language, event, etc. Apart from these default entities, it also gives the user the liberty to add arbitrary classes to the NER model, by training the model to update it with newer trained examples.

Figure 8:
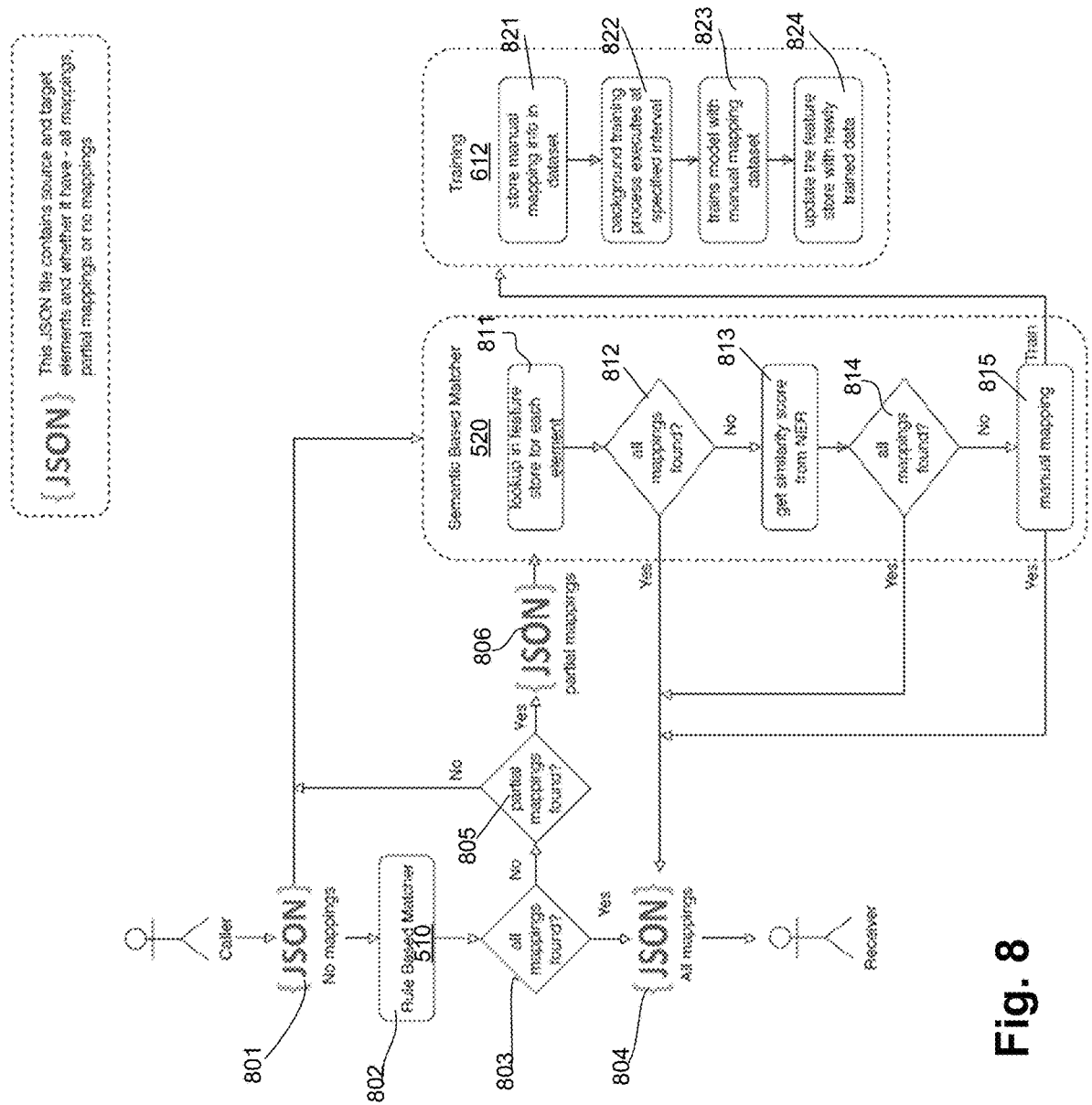
FIG. 8 is a flow diagram of the functionality of the schema mapping feature store system of FIG. 1 for automatically mapping two different schemas of two different enterprise applications on the cloud in accordance with one embodiment.

FIG. 8 is a flow diagram of the functionality of schema mapping feature store system 10 of FIG. 1 for automatically mapping two different schemas of two different enterprise applications on cloud 104 in accordance with one embodiment. In one embodiment, the functionality of the flow diagram of FIG. 8 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 801, a JSON file is received with no mappings after it is determined that there are no mappings available in feature store 310. In the embodiment of FIG. 8 (and other embodiments disclosed herein), a JSON format is used for the internal files, and internal data transfer, even when the input and output schemas are non-JSON, such as XSD. In other embodiments, other formats can be used for the internal files. The JSON file includes source and target elements/attributes/entities and can include, in response to determining mappings from feature store 310, no mappings between the elements, partial mappings between the elements, or all mappings between the elements. At 801, the JSON file has no mappings.

At 802, rule based matcher 510 attempts to match all elements of the JSON file using rules. At 803, it is determined if all mappings are found via the rules. If yes, the JSON file with all mappings is output at 804.

If no at 803, then it is determined of partial/some of the mappings were found at 805. If yes, the JSON file with partial mappings is input to semantic based matcher 520. If no at 805, the JSON file with no mappings is input to semantic based matcher 520.

Semantic based matcher at 811 generates a lookup in feature store 310 for each of the source elements. If all mappings are found via lookup at 812, then the JSON is output at 804. If no at 812, a confidence/similarity score is generated using NER for each element. If this does not result in all mappings found at 814, manual mapping is implemented for the unmapped elements at 815.

The result of the manual mapping at 815 is provided to training module 612 in order to train the NER and update feature store 310. At 821, the manual mapping is stored into a dataset. At 822, a background training process executes at a specified interval. At 823, the model is trained with the manual mapping dataset of 821 (i.e., a new dataset to be used for training the model). At 824, the feature store is updated with the newly trained data (i.e., newly trained mappings.

Example Cloud Infrastructure

FIGS. 9-12 illustrate an example cloud infrastructure that can incorporate the cloud based schema mapping feature store system in accordance to embodiments. The cloud infrastructure of FIG. 9-12 can be used to implement network/cloud 104 of FIG. 1.

As disclosed above, infrastructure as a service ("IaaS") is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network ("WAN"), such as the Internet, and can use the cloud provider's services to install the remaining elements of an application stack. For example, the user can log in to the IaaS platform to create virtual machines ("VM"s), install operating systems ("OS"s) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand)) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds ("VPC"s) (e.g., a potentially on-demand pool of configurable and/or shared computing resources), also known as a core network. In some examples, there may also be one or more security group rules provisioned to define how the security of the network will be set up and one or more virtual machines. Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 9:
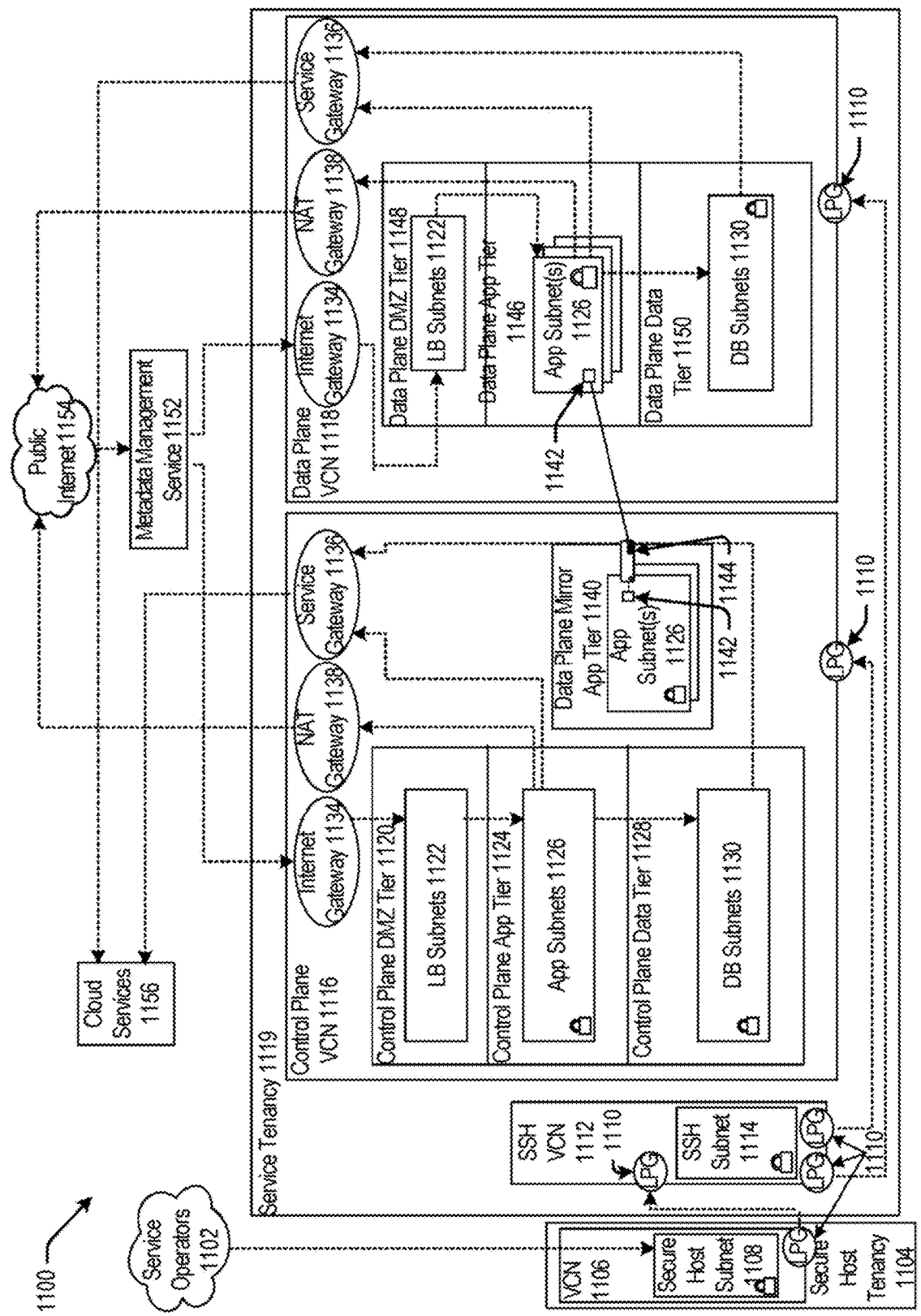
FIGS. 9-12 illustrate an example cloud infrastructure that can incorporate the secure on-premises to cloud connector framework system in accordance to embodiments.

FIG. 9 is a block diagram 1100 illustrating an example pattern of an IaaS architecture, according to at least one embodiment. Service operators 1102 can be communicatively coupled to a secure host tenancy 1104 that can include a virtual cloud network ("VCN") 1106 and a secure host subnet 1108. In some examples, the service operators 1102 may be using one or more client computing devices, which may be portable handheld devices (e.g., an iPhone®, cellular telephone, an iPad®, computing tablet, a personal digital assistant ("PDA")) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service ("SMS"), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1106 and/or the Internet.

The VCN 1106 can include a local peering gateway ("LPG") 1110 that can be communicatively coupled to a secure shell ("SSH") VCN 1112 via an LPG 1110 contained in the SSH VCN 1112. The SSH VCN 1112 can include an SSH subnet 1114, and the SSH VCN 1112 can be communicatively coupled to a control plane VCN 1116 via the LPG 1110 contained in the control plane VCN 1116. Also, the SSH VCN 1112 can be communicatively coupled to a data plane VCN 1118 via an LPG 1110. The control plane VCN 1116 and the data plane VCN 1118 can be contained in a service tenancy 1119 that can be owned and/or operated by the IaaS provider.

The control plane VCN 1116 can include a control plane demilitarized zone ("DMZ") tier 1120 that acts as a perimeter network (e.g., portions of a corporate network between the corporate intranet and external networks). The DMZ-based servers may have restricted responsibilities and help keep security breaches contained. Additionally, the DMZ tier 1120 can include one or more load balancer ("LB") subnet(s) 1122, a control plane app tier 1124 that can include app subnet(s) 1126, a control plane data tier 1128 that can include database (DB) subnet(s) 1130 (e.g., frontend DB subnet(s) and/or backend DB subnet(s)). The LB subnet(s) 1122 contained in the control plane DMZ tier 1120 can be communicatively coupled to the app subnet(s) 1126 contained in the control plane app tier 1124 and an Internet gateway 1134 that can be contained in the control plane VCN 1116, and the app subnet(s) 1126 can be communicatively coupled to the DB subnet(s) 1130 contained in the control plane data tier 1128 and a service gateway 1136 and a network address translation (NAT) gateway 1138. The control plane VCN 1116 can include the service gateway 1136 and the NAT gateway 1138.

The control plane VCN 1116 can include a data plane mirror app tier 1140 that can include app subnet(s) 1126. The app subnet(s) 1126 contained in the data plane mirror app tier 1140 can include a virtual network interface controller (VNIC) 1142 that can execute a compute instance 1144. The compute instance 1144 can communicatively couple the app subnet(s) 1126 of the data plane mirror app tier 1140 to app subnet(s) 1126 that can be contained in a data plane app tier 1146.

The data plane VCN 1118 can include the data plane app tier 1146, a data plane DMZ tier 1148, and a data plane data tier 1150. The data plane DMZ tier 1148 can include LB subnet(s) 1122 that can be communicatively coupled to the app subnet(s) 1126 of the data plane app tier 1146 and the Internet gateway 1134 of the data plane VCN 1118. The app subnet(s) 1126 can be communicatively coupled to the service gateway 1136 of the data plane VCN 1118 and the NAT gateway 1138 of the data plane VCN 1118. The data plane data tier 1150 can also include the DB subnet(s) 1130 that can be communicatively coupled to the app subnet(s) 1126 of the data plane app tier 1146.

The Internet gateway 1134 of the control plane VCN 1116 and of the data plane VCN 1118 can be communicatively coupled to a metadata management service 1152 that can be communicatively coupled to public Internet 1154. Public Internet 1154 can be communicatively coupled to the NAT gateway 1138 of the control plane VCN 1116 and of the data plane VCN 1118. The service gateway 1136 of the control plane VCN 1116 and of the data plane VCN 1118 can be communicatively coupled to cloud services 1156.

In some examples, the service gateway 1136 of the control plane VCN 1116 or of the data plane VCN 1118 can make application programming interface ("API") calls to cloud services 1156 without going through public Internet 1154. The API calls to cloud services 1156 from the service gateway 1136 can be one-way: the service gateway 1136 can make API calls to cloud services 1156, and cloud services 1156 can send requested data to the service gateway 1136. But, cloud services 1156 may not initiate API calls to the service gateway 1136.

In some examples, the secure host tenancy 1104 can be directly connected to the service tenancy 1119, which may be otherwise isolated. The secure host subnet 1108 can communicate with the SSH subnet 1114 through an LPG 1110 that may enable two-way communication over an otherwise isolated system. Connecting the secure host subnet 1108 to the SSH subnet 1114 may give the secure host subnet 1108 access to other entities within the service tenancy 1119.

The control plane VCN 1116 may allow users of the service tenancy 1119 to set up or otherwise provision desired resources. Desired resources provisioned in the control plane VCN 1116 may be deployed or otherwise used in the data plane VCN 1118. In some examples, the control plane VCN 1116 can be isolated from the data plane VCN 1118, and the data plane mirror app tier 1140 of the control plane VCN 1116 can communicate with the data plane app tier 1146 of the data plane VCN 1118 via VNICs 1142 that can be contained in the data plane mirror app tier 1140 and the data plane app tier 1146.

In some examples, users of the system, or customers, can make requests, for example create, read, update, or delete ("CRUD") operations, through public Internet 1154 that can communicate the requests to the metadata management service 1152. The metadata management service 1152 can communicate the request to the control plane VCN 1116 through the Internet gateway 1134. The request can be received by the LB subnet(s) 1122 contained in the control plane DMZ tier 1120. The LB subnet(s) 1122 may determine that the request is valid, and in response to this determination, the LB subnet(s) 1122 can transmit the request to app subnet(s) 1126 contained in the control plane app tier 1124. If the request is validated and requires a call to public Internet 1154, the call to public Internet 1154 may be transmitted to the NAT gateway 1138 that can make the call to public Internet 1154. Memory that may be desired to be stored by the request can be stored in the DB subnet(s) 1130.

In some examples, the data plane mirror app tier 1140 can facilitate direct communication between the control plane VCN 1116 and the data plane VCN 1118. For example, changes, updates, or other suitable modifications to configuration may be desired to be applied to the resources contained in the data plane VCN 1118. Via a VNIC 1142, the control plane VCN 1116 can directly communicate with, and can thereby execute the changes, updates, or other suitable modifications to configuration to, resources contained in the data plane VCN 1118.

In some embodiments, the control plane VCN 1116 and the data plane VCN 1118 can be contained in the service tenancy 1119. In this case, the user, or the customer, of the system may not own or operate either the control plane VCN 1116 or the data plane VCN 1118. Instead, the IaaS provider may own or operate the control plane VCN 1116 and the data plane VCN 1118, both of which may be contained in the service tenancy 1119. This embodiment can enable isolation of networks that may prevent users or customers from interacting with other users', or other customers', resources. Also, this embodiment may allow users or customers of the system to store databases privately without needing to rely on public Internet 1154, which may not have a desired level of security, for storage.

In other embodiments, the LB subnet(s) 1122 contained in the control plane VCN 1116 can be configured to receive a signal from the service gateway 1136. In this embodiment, the control plane VCN 1116 and the data plane VCN 1118 may be configured to be called by a customer of the IaaS provider without calling public Internet 1154. Customers of the IaaS provider may desire this embodiment since database(s) that the customers use may be controlled by the IaaS provider and may be stored on the service tenancy 1119, which may be isolated from public Internet 1154.

Figure 10:
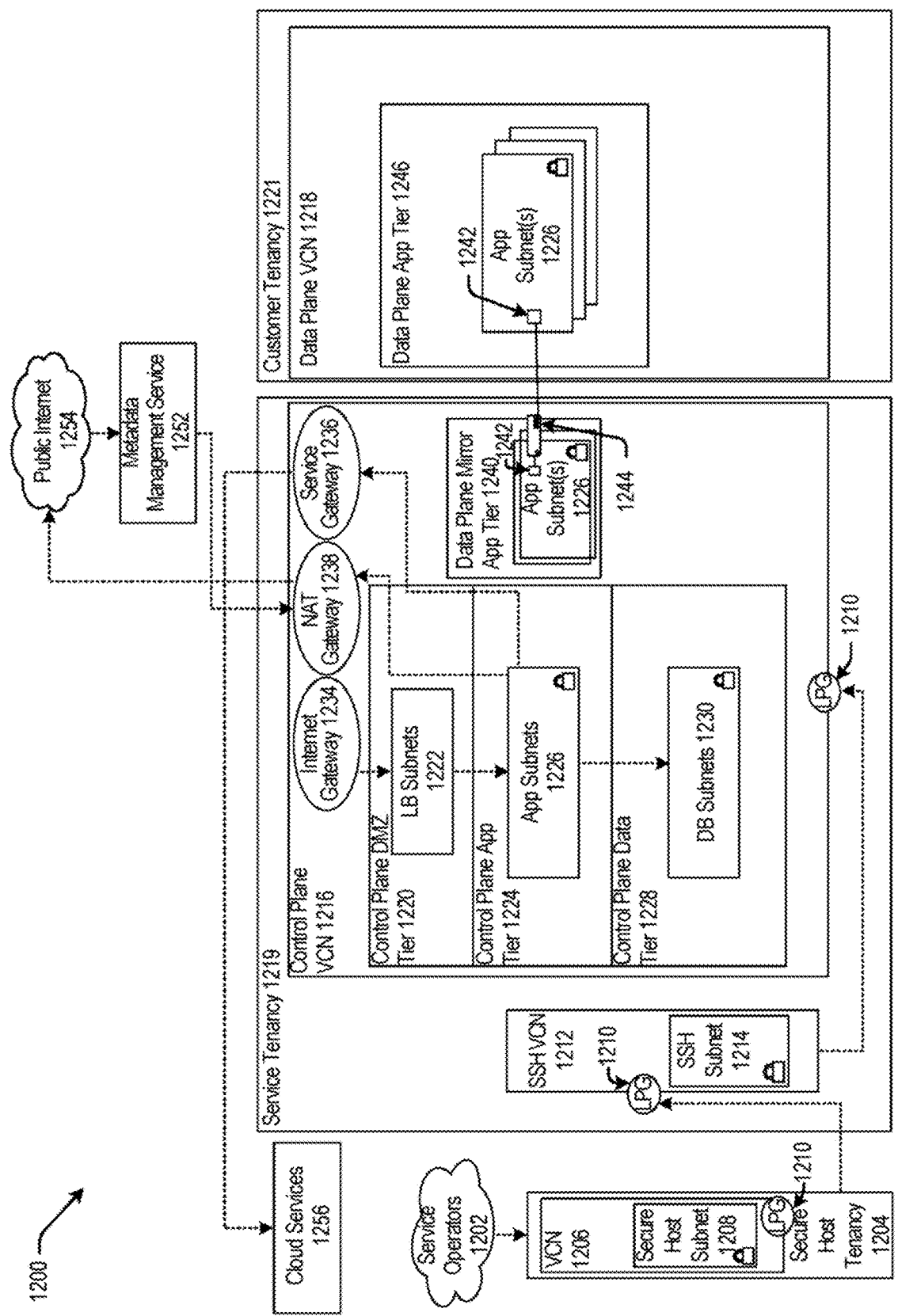

FIG. 10 is a block diagram 1200 illustrating another example pattern of an IaaS architecture, according to at least one embodiment. Service operators 1202 (e.g. service operators 1102) can be communicatively coupled to a secure host tenancy 1204 (e.g. the secure host tenancy 1104) that can include a virtual cloud network (VCN) 1206 (e.g. the VCN 1106) and a secure host subnet 1208 (e.g. the secure host subnet 1108). The VCN 1206 can include a local peering gateway (LPG) 1210 (e.g. the LPG 1110) that can be communicatively coupled to a secure shell (SSH) VCN 1212 (e.g. the SSH VCN 1112 10) via an LPG 1110 contained in the SSH VCN 1212. The SSH VCN 1212 can include an SSH subnet 1214 (e.g. the SSH subnet 1114), and the SSH VCN 1212 can be communicatively coupled to a control plane VCN 1216 (e.g. the control plane VCN 1116) via an LPG 1210 contained in the control plane VCN 1216. The control plane VCN 1216 can be contained in a service tenancy 1219 (e.g. the service tenancy 1119), and the data plane VCN 1218 (e.g. the data plane VCN 1118) can be contained in a customer tenancy 1221 that may be owned or operated by users, or customers, of the system.

The control plane VCN 1216 can include a control plane DMZ tier 1220 (e.g. the control plane DMZ tier 1120) that can include LB subnet(s) 1222 (e.g. LB subnet(s) 1122), a control plane app tier 1224 (e.g. the control plane app tier 1124) that can include app subnet(s) 1226 (e.g. app subnet(s) 1126), a control plane data tier 1228 (e.g. the control plane data tier 1128) that can include database (DB) subnet(s) 1230 (e.g. similar to DB subnet(s) 1130). The LB subnet(s) 1222 contained in the control plane DMZ tier 1220 can be communicatively coupled to the app subnet(s) 1226 contained in the control plane app tier 1224 and an Internet gateway 1234 (e.g. the Internet gateway 1134) that can be contained in the control plane VCN 1216, and the app subnet(s) 1226 can be communicatively coupled to the DB subnet(s) 1230 contained in the control plane data tier 1228 and a service gateway 1236 and a network address translation (NAT) gateway 1238 (e.g. the NAT gateway 1138). The control plane VCN 1216 can include the service gateway 1236 and the NAT gateway 1238.

The control plane VCN 1216 can include a data plane mirror app tier 1240 (e.g. the data plane mirror app tier 1140) that can include app subnet(s) 1226. The app subnet(s) 1226 contained in the data plane mirror app tier 1240 can include a virtual network interface controller (VNIC) 1242 (e.g. the VNIC of 1142) that can execute a compute instance 1244 (e.g. similar to the compute instance 1144). The compute instance 1244 can facilitate communication between the app subnet(s) 1226 of the data plane mirror app tier 1240 and the app subnet(s) 1226 that can be contained in a data plane app tier 1246 (e.g. the data plane app tier 1146) via the VNIC 1242 contained in the data plane mirror app tier 1240 and the VNIC 1242 contained in the data plane app tier 1246.

The Internet gateway 1234 contained in the control plane VCN 1216 can be communicatively coupled to a metadata management service 1252 (e.g. the metadata management service 1152) that can be communicatively coupled to public Internet 1254 (e.g. public Internet 1154). Public Internet 1254 can be communicatively coupled to the NAT gateway 1238 contained in the control plane VCN 1216. The service gateway 1236 contained in the control plane VCN 1216 can be communicatively couple to cloud services 1256 (e.g. cloud services 1156).

In some examples, the data plane VCN 1218 can be contained in the customer tenancy 1221. In this case, the IaaS provider may provide the control plane VCN 1216 for each customer, and the IaaS provider may, for each customer, set up a unique compute instance 1244 that is contained in the service tenancy 1219. Each compute instance 1244 may allow communication between the control plane VCN 1216, contained in the service tenancy 1219, and the data plane VCN 1218 that is contained in the customer tenancy 1221. The compute instance 1244 may allow resources that are provisioned in the control plane VCN 1216 that is contained in the service tenancy 1219, to be deployed or otherwise used in the data plane VCN 1218 that is contained in the customer tenancy 1221.

In other examples, the customer of the IaaS provider may have databases that live in the customer tenancy 1221. In this example, the control plane VCN 1216 can include the data plane mirror app tier 1240 that can include app subnet(s) 1226. The data plane mirror app tier 1240 can reside in the data plane VCN 1218, but the data plane mirror app tier 1240 may not live in the data plane VCN 1218. That is, the data plane mirror app tier 1240 may have access to the customer tenancy 1221, but the data plane mirror app tier 1240 may not exist in the data plane VCN 1218 or be owned or operated by the customer of the IaaS provider. The data plane mirror app tier 1240 may be configured to make calls to the data plane VCN 1218, but may not be configured to make calls to any entity contained in the control plane VCN 1216. The customer may desire to deploy or otherwise use resources in the data plane VCN 1218 that are provisioned in the control plane VCN 1216, and the data plane mirror app tier 1240 can facilitate the desired deployment, or other usage of resources, of the customer.

In some embodiments, the customer of the IaaS provider can apply filters to the data plane VCN 1218. In this embodiment, the customer can determine what the data plane VCN 1218 can access, and the customer may restrict access to public Internet 1254 from the data plane VCN 1218. The IaaS provider may not be able to apply filters or otherwise control access of the data plane VCN 1218 to any outside networks or databases. Applying filters and controls by the customer onto the data plane VCN 1218, contained in the customer tenancy 1221, can help isolate the data plane VCN 1218 from other customers and from public Internet 1254.

In some embodiments, cloud services 1256 can be called by the service gateway 1236 to access services that may not exist on public Internet 1254, on the control plane VCN 1216, or on the data plane VCN 1218. The connection between cloud services 1256 and the control plane VCN 1216 or the data plane VCN 1218 may not be live or continuous. Cloud services 1256 may exist on a different network owned or operated by the IaaS provider. Cloud services 1256 may be configured to receive calls from the service gateway 1236 and may be configured to not receive calls from public Internet 1254. Some cloud services 1256 may be isolated from other cloud services 1256, and the control plane VCN 1216 may be isolated from cloud services 1256 that may not be in the same region as the control plane VCN 1216. For example, the control plane VCN 1216 may be located in "Region 1," and cloud service "Deployment 8," may be located in Region 1 and in "Region 2." If a call to Deployment 8 is made by the service gateway 1236 contained in the control plane VCN 1216 located in Region 1, the call may be transmitted to Deployment 8 in Region 1. In this example, the control plane VCN 1216, or Deployment 8 in Region 1, may not be communicatively coupled to, or otherwise in communication with, Deployment 8 in Region 2.

Figure 11:
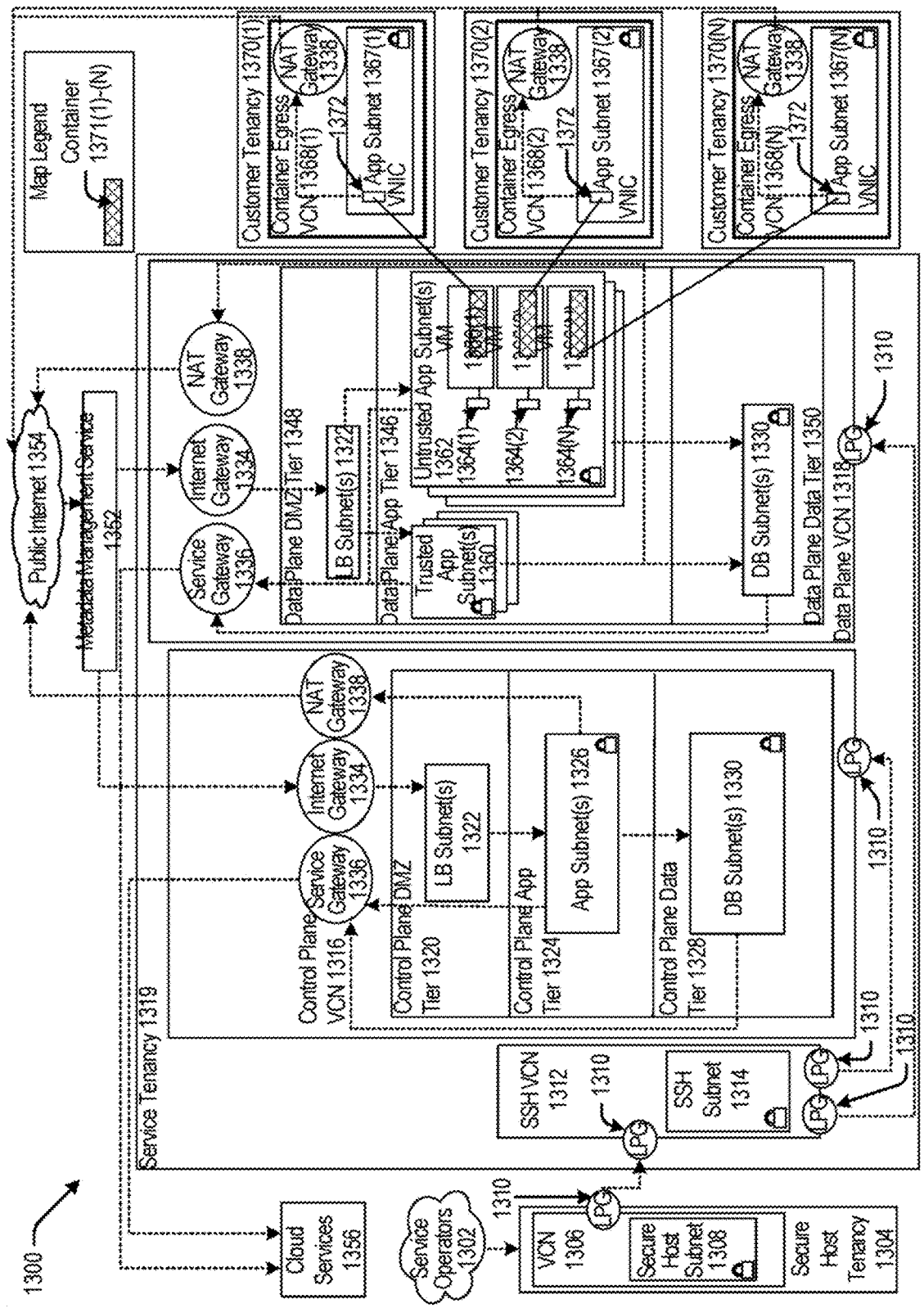

FIG. 11 is a block diagram 1300 illustrating another example pattern of an IaaS architecture, according to at least one embodiment. Service operators 1302 (e.g. service operators 1102) can be communicatively coupled to a secure host tenancy 1304 (e.g. the secure host tenancy 1104) that can include a virtual cloud network (VCN) 1306 (e.g. the VCN 1106) and a secure host subnet 1308 (e.g. the secure host subnet 1108). The VCN 1306 can include an LPG 1310 (e.g. the LPG 1110) that can be communicatively coupled to an SSH VCN 1312 (e.g. the SSH VCN 1112) via an LPG 1310 contained in the SSH VCN 1312. The SSH VCN 1312 can include an SSH subnet 1314 (e.g. the SSH subnet 1114), and the SSH VCN 1312 can be communicatively coupled to a control plane VCN 1316 (e.g. the control plane VCN 1116) via an LPG 1310 contained in the control plane VCN 1316 and to a data plane VCN 1318 (e.g. the data plane 1118) via an LPG 1310 contained in the data plane VCN 1318. The control plane VCN 1316 and the data plane VCN 1318 can be contained in a service tenancy 1319 (e.g. the service tenancy 1119).

The control plane VCN 1316 can include a control plane DMZ tier 1320 (e.g. the control plane DMZ tier 1120) that can include load balancer ("LB") subnet(s) 1322 (e.g. LB subnet(s) 1122), a control plane app tier 1324 (e.g. the control plane app tier 1124) that can include app subnet(s) 1326 (e.g. similar to app subnet(s) 1126), a control plane data tier 1328 (e.g. the control plane data tier 1128) that can include DB subnet(s) 1330. The LB subnet(s) 1322 contained in the control plane DMZ tier 1320 can be communicatively coupled to the app subnet(s) 1326 contained in the control plane app tier 1324 and to an Internet gateway 1334 (e.g. the Internet gateway 1134) that can be contained in the control plane VCN 1316, and the app subnet(s) 1326 can be communicatively coupled to the DB subnet(s) 1330 contained in the control plane data tier 1328 and to a service gateway 1336 (e.g. the service gateway) and a network address translation (NAT) gateway 1338 (e.g. the NAT gateway 1138). The control plane VCN 1316 can include the service gateway 1336 and the NAT gateway 1338.

The data plane VCN 1318 can include a data plane app tier 1346 (e.g. the data plane app tier 1146), a data plane DMZ tier 1348 (e.g. the data plane DMZ tier 1148), and a data plane data tier 1350 (e.g. the data plane data tier 1150 of FIG. 10). The data plane DMZ tier 1348 can include LB subnet(s) 1322 that can be communicatively coupled to trusted app subnet(s) 1360 and untrusted app subnet(s) 1362 of the data plane app tier 1346 and the Internet gateway 1334 contained in the data plane VCN 1318. The trusted app subnet(s) 1360 can be communicatively coupled to the service gateway 1336 contained in the data plane VCN 1318, the NAT gateway 1338 contained in the data plane VCN 1318, and DB subnet(s) 1330 contained in the data plane data tier 1350. The untrusted app subnet(s) 1362 can be communicatively coupled to the service gateway 1336 contained in the data plane VCN 1318 and DB subnet(s) 1330 contained in the data plane data tier 1350. The data plane data tier 1350 can include DB subnet(s) 1330 that can be communicatively coupled to the service gateway 1336 contained in the data plane VCN 1318.

The untrusted app subnet(s) 1362 can include one or more primary VNICs 1364(1)-(N) that can be communicatively coupled to tenant virtual machines (VMs) 1366(1)-(N). Each tenant VM 1366(1)-(N) can be communicatively coupled to a respective app subnet 1367(1)-(N) that can be contained in respective container egress VCNs 1368(1)-(N) that can be contained in respective customer tenancies 1370(1)-(N). Respective secondary VNICs 1372(1)-(N) can facilitate communication between the untrusted app subnet(s) 1362 contained in the data plane VCN 1318 and the app subnet contained in the container egress VCNs 1368(1)-(N). Each container egress VCNs 1368(1)-(N) can include a NAT gateway 1338 that can be communicatively coupled to public Internet 1354 (e.g. public Internet 1154).

The Internet gateway 1334 contained in the control plane VCN 1316 and contained in the data plane VCN 1318 can be communicatively coupled to a metadata management service 1352 (e.g. the metadata management system 1152) that can be communicatively coupled to public Internet 1354. Public Internet 1354 can be communicatively coupled to the NAT gateway 1338 contained in the control plane VCN 1316 and contained in the data plane VCN 1318. The service gateway 1336 contained in the control plane VCN 1316 and contained in the data plane VCN 1318 can be communicatively couple to cloud services 1356.

In some embodiments, the data plane VCN 1318 can be integrated with customer tenancies 1370. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1346. Code to run the function may be executed in the VMs 1366(1)-(N), and the code may not be configured to run anywhere else on the data plane VCN 1318. Each VM 1366(1)-(N) may be connected to one customer tenancy 1370. Respective containers 1371(1)-(N) contained in the VMs 1366(1)-(N) may be configured to run the code. In this case, there can be a dual isolation (e.g., the containers 1371(1)-(N) running code, where the containers 1371(1)-(N) may be contained in at least the VM 1366(1)-(N) that are contained in the untrusted app subnet(s) 1362), which may help prevent incorrect or otherwise undesirable code from damaging the network of the IaaS provider or from damaging a network of a different customer. The containers 1371(1)-(N) may be communicatively coupled to the customer tenancy 1370 and may be configured to transmit or receive data from the customer tenancy 1370. The containers 1371(1)-(N) may not be configured to transmit or receive data from any other entity in the data plane VCN 1318. Upon completion of running the code, the IaaS provider may kill or otherwise dispose of the containers 1371(1)-(N).

In some embodiments, the trusted app subnet(s) 1360 may run code that may be owned or operated by the IaaS provider. In this embodiment, the trusted app subnet(s) 1360 may be communicatively coupled to the DB subnet(s) 1330 and be configured to execute CRUD operations in the DB subnet(s) 1330. The untrusted app subnet(s) 1362 may be communicatively coupled to the DB subnet(s) 1330, but in this embodiment, the untrusted app subnet(s) may be configured to execute read operations in the DB subnet(s) 1330. The containers 1371(1)-(N) that can be contained in the VM 1366(1)-(N) of each customer and that may run code from the customer may not be communicatively coupled with the DB subnet(s) 1330.

In other embodiments, the control plane VCN 1316 and the data plane VCN 1318 may not be directly communicatively coupled. In this embodiment, there may be no direct communication between the control plane VCN 1316 and the data plane VCN 1318. However, communication can occur indirectly through at least one method. An LPG 1310 may be established by the IaaS provider that can facilitate communication between the control plane VCN 1316 and the data plane VCN 1318. In another example, the control plane VCN 1316 or the data plane VCN 1318 can make a call to cloud services 1356 via the service gateway 1336. For example, a call to cloud services 1356 from the control plane VCN 1316 can include a request for a service that can communicate with the data plane VCN 1318.

Figure 12:
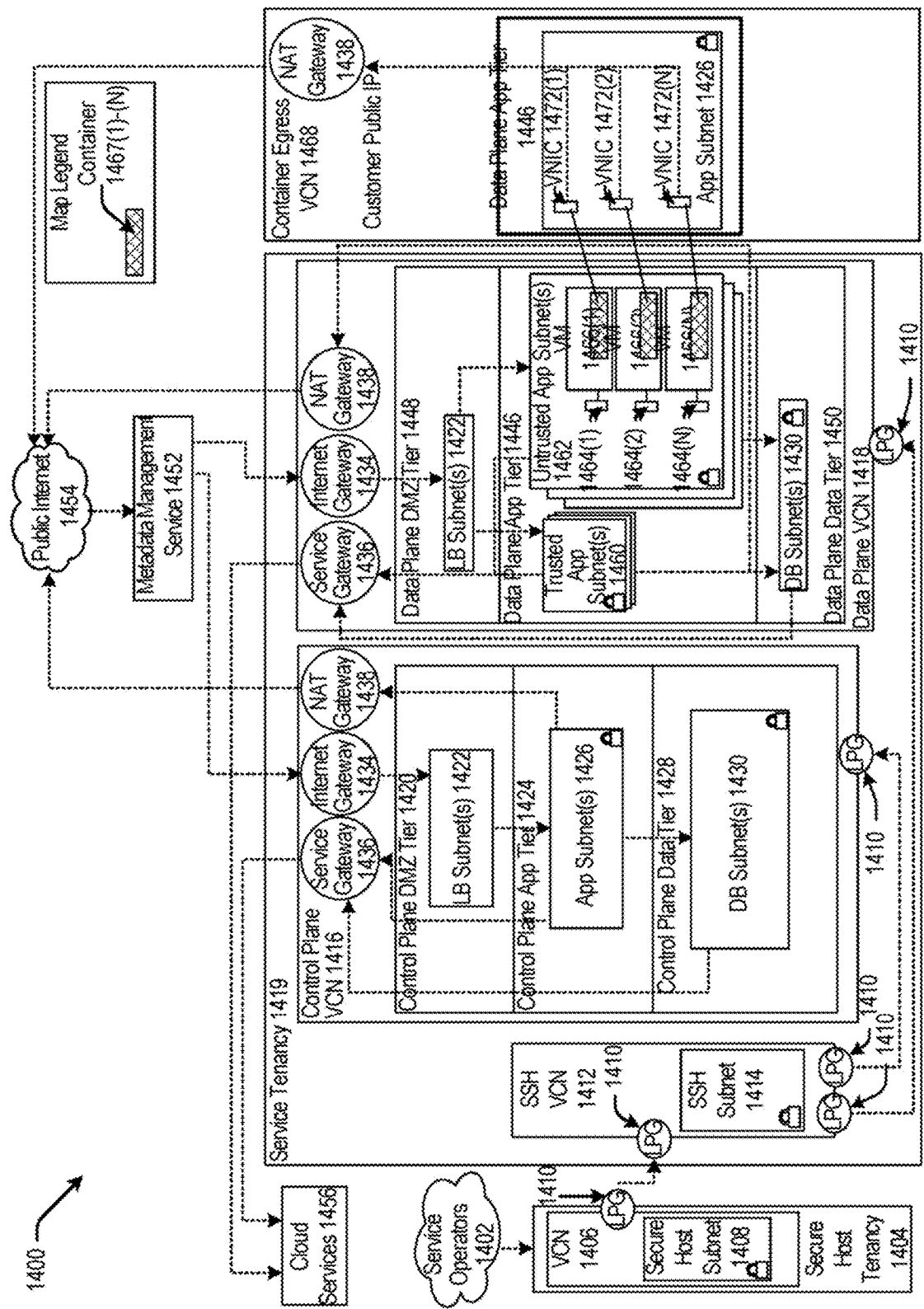

FIG. 12 is a block diagram 1400 illustrating another example pattern of an IaaS architecture, according to at least one embodiment. Service operators 1402 (e.g. service operators 1102) can be communicatively coupled to a secure host tenancy 1404 (e.g. the secure host tenancy 1104) that can include a virtual cloud network ("VCN") 1406 (e.g. the VCN 1106) and a secure host subnet 1408 (e.g. the secure host subnet 1108). The VCN 1406 can include an LPG 1410 (e.g. the LPG 1110) that can be communicatively coupled to an SSH VCN 1412 (e.g. the SSH VCN 1112) via an LPG 1410 contained in the SSH VCN 1412. The SSH VCN 1412 can include an SSH subnet 1414 (e.g. the SSH subnet 1114), and the SSH VCN 1412 can be communicatively coupled to a control plane VCN 1416 (e.g. the control plane VCN 1116) via an LPG 1410 contained in the control plane VCN 1416 and to a data plane VCN 1418 (e.g. the data plane 1118) via an LPG 1410 contained in the data plane VCN 1418. The control plane VCN 1416 and the data plane VCN 1418 can be contained in a service tenancy 1419 (e.g. the service tenancy 1119).

The control plane VCN 1416 can include a control plane DMZ tier 1420 (e.g. the control plane DMZ tier 1120) that can include LB subnet(s) 1422 (e.g. LB subnet(s) 1122), a control plane app tier 1424 (e.g. the control plane app tier 1124) that can include app subnet(s) 1426 (e.g. app subnet(s) 1126), a control plane data tier 1428 (e.g. the control plane data tier 1128) that can include DB subnet(s) 1430 (e.g. DB subnet(s) 1330). The LB subnet(s) 1422 contained in the control plane DMZ tier 1420 can be communicatively coupled to the app subnet(s) 1426 contained in the control plane app tier 1424 and to an Internet gateway 1434 (e.g. the Internet gateway 1134) that can be contained in the control plane VCN 1416, and the app subnet(s) 1426 can be communicatively coupled to the DB subnet(s) 1430 contained in the control plane data tier 1428 and to a service gateway 1436 (e.g. the service gateway of FIG. 10) and a network address translation (NAT) gateway 1438 (e.g. the NAT gateway 1138 of FIG. 10). The control plane VCN 1416 can include the service gateway 1436 and the NAT gateway 1438.

The data plane VCN 1418 can include a data plane app tier 1446 (e.g. the data plane app tier 1146), a data plane DMZ tier 1448 (e.g. the data plane DMZ tier 1148), and a data plane data tier 1450 (e.g. the data plane data tier 1150). The data plane DMZ tier 1448 can include LB subnet(s) 1422 that can be communicatively coupled to trusted app subnet(s) 1460 (e.g. trusted app subnet(s) 1360) and untrusted app subnet(s) 1462 (e.g. untrusted app subnet(s) 1362) of the data plane app tier 1446 and the Internet gateway 1434 contained in the data plane VCN 1418. The trusted app subnet(s) 1460 can be communicatively coupled to the service gateway 1436 contained in the data plane VCN 1418, the NAT gateway 1438 contained in the data plane VCN 1418, and DB subnet(s) 1430 contained in the data plane data tier 1450. The untrusted app subnet(s) 1462 can be communicatively coupled to the service gateway 1436 contained in the data plane VCN 1418 and DB subnet(s) 1430 contained in the data plane data tier 1450. The data plane data tier 1450 can include DB subnet(s) 1430 that can be communicatively coupled to the service gateway 1436 contained in the data plane VCN 1418.

The untrusted app subnet(s) 1462 can include primary VNICs 1464(1)-(N) that can be communicatively coupled to tenant virtual machines (VMs) 1466(1)-(N) residing within the untrusted app subnet(s) 1462. Each tenant VM 1466(1)-(N) can run code in a respective container 1467(1)-(N), and be communicatively coupled to an app subnet 1426 that can be contained in a data plane app tier 1446 that can be contained in a container egress VCN 1468. Respective secondary VNICs 1472(1)-(N) can facilitate communication between the untrusted app subnet(s) 1462 contained in the data plane VCN 1418 and the app subnet contained in the container egress VCN 1468. The container egress VCN can include a NAT gateway 1438 that can be communicatively coupled to public Internet 1454 (e.g. public Internet 1154).

The Internet gateway 1434 contained in the control plane VCN 1416 and contained in the data plane VCN 1418 can be communicatively coupled to a metadata management service 1452 (e.g. the metadata management system 1152) that can be communicatively coupled to public Internet 1454. Public Internet 1454 can be communicatively coupled to the NAT gateway 1438 contained in the control plane VCN 1416 and contained in the data plane VCN 1418. The service gateway 1436 contained in the control plane VCN 1416 and contained in the data plane VCN 1418 can be communicatively couple to cloud services 1456.

In some examples, the pattern illustrated by the architecture of block diagram 1400 of FIG. 12 may be considered an exception to the pattern illustrated by the architecture of block diagram 1300 of FIG. 11 and may be desirable for a customer of the IaaS provider if the IaaS provider cannot directly communicate with the customer (e.g., a disconnected region). The respective containers 1467(1)-(N) that are contained in the VMs 1466(1)-(N) for each customer can be accessed in real-time by the customer. The containers 1467(1)-(N) may be configured to make calls to respective secondary VNICs 1472(1)-(N) contained in app subnet(s) 1426 of the data plane app tier 1446 that can be contained in the container egress VCN 1468. The secondary VNICs 1472(1)-(N) can transmit the calls to the NAT gateway 1438 that may transmit the calls to public Internet 1454. In this example, the containers 1467(1)-(N) that can be accessed in real-time by the customer can be isolated from the control plane VCN 1416 and can be isolated from other entities contained in the data plane VCN 1418. The containers 1467(1)-(N) may also be isolated from resources from other customers.

In other examples, the customer can use the containers 1467(1)-(N) to call cloud services 1456. In this example, the customer may run code in the containers 1467(1)-(N) that requests a service from cloud services 1456. The containers 1467(1)-(N) can transmit this request to the secondary VNICs 1472(1)-(N) that can transmit the request to the NAT gateway that can transmit the request to public Internet 1454. Public Internet 1454 can transmit the request to LB subnet(s) 1422 contained in the control plane VCN 1416 via the Internet gateway 1434. In response to determining the request is valid, the LB subnet(s) can transmit the request to app subnet(s) 1426 that can transmit the request to cloud services 1456 via the service gateway 1436.

It should be appreciated that IaaS architectures 1100, 1200, 1300, 1400 depicted in the figures may have other components than those depicted. Further, the embodiments shown in the figures are only some examples of a cloud infrastructure system that may incorporate certain embodiments. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure ("OCI") provided by the present assignee.

As disclosed, embodiments provide a cloud based feature store and system for mappings source schema attributes to target schema attributes. The feature store evolves (i.e., is trained) based on training an NER model to improve the possible mappings stored in the feature store in order to reduce or eliminate the need for manual mapping.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

What is claimed is:

1. A method of mapping a source schema of a first cloud based application to a target schema of a second cloud based application using a cloud based feature store, wherein the feature store comprises a central repository of features used for machine learning model training, the method comprising:

receiving a file comprising a plurality of source schema terms of the first application and a plurality of target schema terms of the second application, the file comprising a plurality of unmapped terms, wherein the source schema specifies how each of the source schema terms provide a first application name for each underlying data element of first application data stored in a first database, and the target schema specifies how the each of the target schema terms provide a second application name for each underlying data element of second application data stored in a second database, wherein the underlying data elements stored in the first database are the same as the underlying data elements stored in the second database;

parsing the source schema and the target schema and extracting source schema terms and target schema terms that correspond to the underlying data elements;

retrieving rule based mappings for the unmapped terms between the source schema terms and the target schema terms and generating rule based matches between source schema terms and target schema terms;

based on semantic matching of the source schema terms, retrieving feature store based mappings from the feature store for the unmapped terms between the source schema terms and the target schema terms that were not matched using the rule based mappings, wherein the semantic matching comprises classifying named entities mentioned in unstructured text into pre-defined categories using a trained named entity recognition (NER) model;

generating one or more similarity scores for the feature store based mappings of the source schema terms to the target schema terms; and generating possible feature store based mappings for the extracted source schema terms and target schema terms based on the similarity scores;

wherein the feature store comprises key-value pairs with keys corresponding to source schema terms and values corresponding to matched target schema terms;

transferring the underlying data elements from the first database to the second database and, based on the feature store based mappings, automatically transforming by the feature store the source schema terms to corresponding target schema terms for each of the underlying data elements, the transforming comprising converting source messages of the source schema into target messages of the target schema.

2. The method of claim 1, the generating one or more similarity scores comprises using the trained named NER model.

3. The method of claim 2, further comprising:
receiving one or more manual mappings of the source schema terms to the target schema terms in response to the possible feature store based mappings;
re-training the trained NER model based on the manual mappings.

4. The method of claim 3, further comprising updating the feature store with the re-trained NER model.

5. The method of claim 1, wherein the retrieving feature store based mappings from the feature store for the unmapped terms occurs after the retrieving rule based mappings for any remaining unmapped terms.

6. The method of claim 5, wherein the generating one or more similarity scores for mappings occurs after the retrieving feature store based mappings from the feature store for any remaining unmapped terms.

7. The method of claim 1, wherein the source schema and target schema both comprise an Extensible Markup Language (XML) schema or a JavaScript Object Notation (JSON) schema and the keys in the feature store are organized based on domain, sub domain, entities and values.

8. A non-transitory computer readable medium having instructions stored thereon that, when executed by one or more processors on a cloud infrastructure, cause the processors to map a source schema of a first cloud based application to a target schema of a second cloud based application using a cloud based feature store, wherein the feature store comprises a central repository of features used for machine learning model training, the mapping comprising:
receiving a file comprising a plurality of source schema terms of the first application and a plurality of target schema terms of the second application, the file comprising a plurality of unmapped terms, wherein the source schema specifies how each of the source schema terms provide a first application name for each underlying data element of first application data stored in a first database, and the target schema specifies how the each of the target schema terms provide a second application name for each underlying data element of second application data stored in a second database, wherein the underlying data elements stored in the first database are the same as the underlying data elements stored in the second database;
parsing the source schema and the target schema and extracting source schema terms and target schema terms that correspond to the underlying data elements;
retrieving rule based mappings for the unmapped terms between the source schema terms and the target schema terms and generating rule based matches between source schema terms and target schema terms;
based on semantic matching of the source schema terms, retrieving feature store based mappings from the feature store for the unmapped terms between the source schema terms and the target schema terms that were not matched using the rule based mappings, wherein the semantic matching comprises classifying named entities mentioned in unstructured text into pre-defined categories using a trained named entity recognition (NER) model;
generating one or more similarity scores for the feature store based mappings of the source schema terms to the target schema terms; and
generating possible feature store based mappings for the extracted source schema terms and target schema terms based on the similarity scores;
wherein the feature store comprises key-value pairs with keys corresponding to source schema terms and values corresponding to matched target schema terms;
transferring the underlying data elements from the first database to the second database and, based on the feature store based mappings, automatically transforming by the feature store the source schema terms to corresponding target schema terms for each of the underlying data elements, the transforming comprising converting source messages of the source schema into target messages of the target schema.

9. The computer readable medium of claim 8, the generating one or more similarity scores comprises using the trained named entity recognition (NER) model.

10. The computer readable medium of claim 9, the mapping further comprising:
receiving one or more manual mappings of the source schema terms to the target schema terms in response to the possible feature store based mappings;
re-training the trained NER model based on the manual mappings.

11. The computer readable medium of claim 10, further comprising updating the feature store with the re-trained NER model.

12. The computer readable medium of claim 8, wherein the retrieving feature store based mappings from the feature store for the unmapped elements occurs after the retrieving rule based mappings for any remaining unmapped elements.

13. The computer readable medium of claim 12, wherein the retrieving feature store based mappings from the feature store for the unmapped terms occurs after the retrieving rule based mappings for any remaining unmapped terms.

14. The computer readable medium of claim 8, wherein the source schema and target schema both comprise an Extensible Markup Language (XML) schema or a JavaScript Object Notation (JSON) schema and the keys in the feature store are organized based on domain, sub domain, entities and values.

15. A cloud infrastructure comprising:
a mapping service configured to map a source schema of a first cloud based application to a target schema of a second cloud based application using a cloud based feature store, wherein the feature store comprises a central repository of features used for machine learning model training, the mapping service comprising one or more hardware processors executing instructions, the mapping comprising:
receiving a file comprising a plurality of source schema terms of the first application and a plurality of target schema terms of the second application, the file comprising a plurality of unmapped terms, wherein the source schema specifies how each of the source schema terms provide a first application name for each underlying data element of first application data stored in a first database, and the target schema specifies how the each of the target schema terms provide a second application name for each underlying data element of second application data stored in a second database, wherein the underlying data elements stored in the first database are the same as the underlying data elements stored in the second database;
parsing the source schema and the target schema and extracting source schema terms and target schema terms that correspond to the underlying data elements;
retrieving rule based mappings for the unmapped terms between the source schema terms and the target schema terms and generating rule based matches between source schema terms and target schema terms;
based on semantic matching of the source schema terms, retrieving feature store based mappings from the feature store for the unmapped terms between the source schema terms and the target schema terms that were not matched using the rule based mappings, wherein the semantic matching comprises classifying named entities mentioned in unstructured text into pre-defined categories using a trained named entity recognition (NER) model;
generating one or more similarity scores for the feature store based mappings of the source schema terms to the target schema terms; and
generating possible feature store based mappings for the extracted source schema terms and target schema terms based on the similarity scores;
wherein the feature store comprises key-value pairs with keys corresponding to source schema terms and values corresponding to matched target schema terms;
transferring the underlying data elements from the first database to the second database and, based on the feature store based mappings, automatically transforming by the feature store the source schema terms to corresponding target schema terms for each of the underlying data elements, the transforming comprising converting source messages of the source schema into target messages of the target schema.

16. The cloud infrastructure of claim 15, the generating one or more similarity scores comprises using the trained named NER model.

17. The cloud infrastructure of claim 16, the mapping further comprising:
receiving one or more manual mappings of the source schema terms to the target schema terms in response to the possible feature store based mappings;
re-training the trained NER model based on the manual mappings.

18. The cloud infrastructure of claim 17, the mapping further comprising updating the feature store with the re-trained NER model.

19. The cloud infrastructure of claim 15, wherein the retrieving feature store based mappings from the feature store for the unmapped terms occurs after the retrieving rule based mappings for any remaining unmapped terms.

20. The cloud infrastructure of claim 15, wherein the source schema and target schema both comprise an Extensible Markup Language (XML) schema or a JavaScript Object Notation (JSON) schema and the keys in the feature store are organized based on domain, sub domain, entities and values.

* * * * *